United States Patent
Higami

(10) Patent No.: US 6,779,359 B2
(45) Date of Patent: Aug. 24, 2004

(54) REFRIGERANT PROCESSING APPARATUS FOR COLLECTED EQUIPMENT, AND OIL SEPARATOR

(75) Inventor: Sadao Higami, Osaka (JP)

(73) Assignee: Dengen Co., Ltd., Osaka (JP)

( * ) Notice: Subject to any disclaimer, the term of this patent is extended or adjusted under 35 U.S.C. 154(b) by 0 days.

(21) Appl. No.: 10/388,236

(22) Filed: Mar. 14, 2003

(65) Prior Publication Data

US 2003/0196450 A1 Oct. 23, 2003

(30) Foreign Application Priority Data

Mar. 18, 2002 (JP) ........................................ 2002-074486

(51) Int. Cl.[7] .............................................. F25B 43/04
(52) U.S. Cl. ............................ 62/475; 62/77; 62/149
(58) Field of Search ........................ 62/149, 292, 468, 62/470, 474, 77

(56) References Cited

U.S. PATENT DOCUMENTS

| | | | | |
|---|---|---|---|---|
| 4,998,413 A | * | 3/1991 | Sato et al. | 62/149 |
| 5,123,259 A | * | 6/1992 | Morgan, Sr. | 62/292 |
| 5,361,594 A | * | 11/1994 | Young | 62/129 |
| 5,533,359 A | * | 7/1996 | Muston et al. | 62/292 |
| 5,671,605 A | * | 9/1997 | Helterbrand | 62/85 |
| 5,743,110 A | * | 4/1998 | Laude-Bousquet | 62/434 |
| 5,758,514 A | * | 6/1998 | Genung et al. | 62/471 |

FOREIGN PATENT DOCUMENTS

JP 407190568 A * 7/1995

JP 02001304701 A * 10/2001

* cited by examiner

Primary Examiner—William E. Tapolcai
Assistant Examiner—Mohammad M. Ali
(74) Attorney, Agent, or Firm—Westerman, Hattori, Daniels & Adrian, LLP

(57) ABSTRACT

There are provided a high-yield economical, refrigerant processing apparatus for collected equipment which can recover and regenerate a liquid refrigerant by highly efficient thermal conversion and charge collected equipment with the liquid refrigerant, without releasing the refrigerant into the air, and an oil separator for use with the refrigerant processing apparatus. In the oil separator, an oil is separated from an oil-containing refrigerant to be recovered, and in a condenser, a gaseous refrigerant is converted into a liquid refrigerant. The oil separator has a heat exchanging double spiral pipe in which a double pipe made of a central pipe and an external pipe is formed spirally about a vertical central axis of the oil separator, and a heating unit for vaporizing the liquid refrigerant. The refrigerant processing apparatus for collected equipment has an oil recovery channel in which a remaining oil is recovered, a refrigerant regeneration and recovery channel in which the gaseous refrigerant is passed into the condenser and then through a central pipe from above the heat exchanging double spiral pipe, thereby regenerating the gaseous refrigerant as a liquid refrigerant and recovering the liquid refrigerant into a recovery bomb, and a refrigerant charging channel for charging the collected equipment with the liquid refrigerant regenerated from the gaseous refrigerant.

4 Claims, 14 Drawing Sheets

REFRIGERANT PROCESSING APPARATUS FOR COLLECTED EQUIPMENT, AND OIL SEPARATOR

BACKGROUND OF THE INVENTION

1. Field of the Invention

The present invention relates to a refrigerant processing apparatus for collected equipment, which recovers a refrigerant from collected equipment using a refrigerant gas, such as a cooler for domestic use, an air conditioner, a refrigerator and an automobile cooler, without releasing the refrigerant into the air, and as required regenerates a recovered refrigerant and charges the regenerated refrigerant into the collected refrigerant, as well as to an oil separator which is connected to an existing refrigerant recovery system by piping and is used as a refrigerant processing apparatus for collected equipment.

2. Background Art

Refrigerant recovery and refrigerant charging have heretofore been carried out by different kinds of systems, respectively. Refrigerant charging systems have comparatively simple constructions which directly charge collected equipment with refrigerants recovered in their recovery bombs or refrigerants of new recovery bombs. On the other hand, improvements of refrigerant recovery systems have been targets of invention, and many kinds of refrigerant recovery systems have been invented and publicly known.

Many of these publicly known refrigerant recovery systems basically have a construction in which an oil-containing refrigerant of collected equipment is sucked by the suction of a compressor through an evaporating pipe having a suction regulating valve and is separated into a refrigerant and an oil, and a gaseous refrigerant is condensed into a liquid refrigerant by a cooling fan and a condenser to recover the liquid refrigerant into a recovery bomb through a condensation pipe, while the oil is recovered into an oil container. A refrigerant recovery system according to, for example, Japanese Patent Number 3,015,820 is publicly known as a representative invention based on the above-described construction (hereinafter referred to as the publicly known invention).

The refrigerant recovery system according to the publicly known invention will be described with reference to FIG. 15. A refrigerant and an oil are sucked from equipment from which to recovery the refrigerant, through an oil separator by a compressor, and the refrigerant is transferred under pressure to a condenser from an oil recovery container heated by a refrigerant of high temperature and high pressure which is ejected from the oil separator via the compressor. The oil from which the refrigerant has been separated by the heating of heating means is recovered in the oil recovery container, while the refrigerant from the outlet side of the condenser is stored into a container.

In a refrigerant recovery container in which the refrigerant is recovered, a bypass passage is provided between the outlet side of the compressor and the inlet side of the condenser, and a valve which opens and closes the bypass passage so that the refrigerant is returned to the condenser in part through the oil recovery container and in part through the bypass passage.

In particular, the publicly known invention saves power consumption by utilizing as the heating means for the oil recovery container the waste heat of the compressor instead of the heat of a refrigerant gas of high pressure and high temperature which is obtained on the outlet side of the compressor, and also provides mechanical connection between the compressor and the oil recovery container to transmit the vibration of the compressor to the oil recovery container, thereby releasing a gaseous refrigerant from the oil and liquefying the gaseous refrigerant to recover a liquid refrigerant.

However, the refrigerant recovery system constructed in the above-described manner according to the publicly known invention needs a complicated construction in which various devices for oil recovery are disposed in piping, and if collected equipment is to be charged with a refrigerant, a refrigerant charging system for transferring a refrigerant recovered in the refrigerant recovery container must be very uneconomically provided independently of the refrigerant recovery system.

In addition, since a refrigerant passage which passes from the condenser to the oil recovery container and back to the condenser goes to a high-pressure state within the oil recovery container, a liquid refrigerant necessarily remains in the oil recovery container at the time of the completion of recovery, with the result that insufficient recovery occurs, causing the problem that a refrigerant gas is released into the air when the kind of gas to be recovered is changed.

Furthermore, since the publicly known invention only aims to remove a liquid refrigerant from oil, a liquid refrigerant which contains a considerable amount of moisture is regenerated and recovered. If such a liquid refrigerant is directly charged into collected equipment, the cooling function and the mechanical durability of the collected equipment will be degraded. Accordingly, it is necessary to remove moisture from the liquid refrigerant as completely as possible before charging.

SUMMARY OF THE INVENTION

The invention provides an economical refrigerant processing apparatus for collected equipment, which efficiently recovers a refrigerant without releasing a refrigerant gas into the air and has a refrigerant regeneration and charging function. The invention also provides an oil separator which enables efficient recovery, regeneration and charging of a refrigerant of collected equipment by being connected to an existing refrigerant recovery system by piping.

To solve the above-described problems, the invention provides a refrigerant processing apparatus for collected equipment, for use in a refrigerant recovery system in which an oil-containing refrigerant to be recovered is sucked from collected equipment by a compressor and after an oil has been separated from the oil-containing refrigerant by an oil separator having a heater unit, a resultant refrigerant is regenerated as a liquid refrigerant by a condenser and is recovered into a recovery bomb. The refrigerant processing apparatus for collected equipment includes: the oil separator having a construction provided with a separating wall provided in a passage space defined in an upper portion inside a hermetically enclosed evaporating vaporization chamber, a heat exchanging double spiral pipe in which a double pipe made of a central pipe and an external pipe is formed spirally about a vertical central axis, the heat exchanging double spiral pipe being provided in a space below the separating wall, the oil-containing refrigerant being made to collide with the separating wall through the external pipe from below the heat exchanging double spiral pipe to separate the oil-containing refrigerant into a gaseous refrigerant obtained by volatilization or evaporation and an oil-containing liquid refrigerant, and a heating unit for vaporizing the oil-containing liquid refrigerant excluding the oil; an oil recovery channel in which a remaining oil is recovered by heating with the heating unit; a refrigerant regeneration and recovery channel in which a gaseous refrigerant obtained by separating the oil-containing refrigerant and heating the oil-containing liquid refrigerant excluding the oil, and a gaseous refrigerant remaining after regeneration and recovery or being produced by vaporization are passed into a condenser, then a condensed liquid refrigerant from the condenser is passed through the central pipe from above the heat exchanging double spiral pipe and is regenerated as a liquid refrigerant, and then the regenerated liquid refrigerant is recovered into the recovery bomb; and a refrigerant charging channel for charging the collected equipment with the liquid refrigerant regenerated from the gaseous refrigerant. In the refrigerant processing apparatus, recovery, regeneration and charging processes for the refrigerant to be recovered from the collected equipment are selectively controlled and carried out, and the external pipe through which the oil-containing refrigerant passes and the central pipe through which the refrigerant passes are mutually heat-exchanged to heat the oil-containing refrigerant and cool the refrigerant passing through the central pipe, thereby effecting efficient regeneration and recovery of the liquid refrigerant.

To solve the above-described problems, the invention provides an oil separator for a refrigerant processing apparatus for collected equipment, the oil separator including a heating unit for use in a refrigerant recovery system in which after an oil is separated from an oil-containing refrigerant of collected equipment, a liquid refrigerant is recovered into a recovery bomb through a condenser. The oil separator includes as its body an evaporating vaporization chamber made of a hollow body which is closed at its top and bottom by a top end plate and a bottom end plate, respectively, the evaporating vaporization chamber including in its interior a separating wall positioned below the top end plate and provided to define a passage space between the top end plate and a periphery of the separating wall, and a heat exchanging double spiral pipe including a central pipe which serves as a liquid refrigerant recovery passage, and an external pipe which serves as a recovery passage to communicate with the first recovery and charging passage during recovery, the heat exchanging double spiral pipe being formed spirally about a vertical central axis of the oil separator to prevent a refrigerant from staying in the heat exchanging double spiral pipe. The bottom end plate of the evaporating vaporization chamber is provided with a first pipe joint, a fourth pipe joint, a bottom heater and a bottom temperature regulating unit. The first pipe joint leads at one end to a branch passage constructed to switch between the first recovery and charging passage and a passage leading to the oil drain, and the other end of the first pipe joint is opened to the evaporating vaporization chamber as a port which serves as an oil outlet and a refrigerant inlet. The port and the external pipe of the heat exchanging double spiral pipe are formed as a recovery passage, and the first pipe joint is provided with a selector function valve which switches a flow passage to either one of the branch passage and the recovery passage. The fourth pipe joint is inserted through the bottom end plate and is connected to a bottom end of the central pipe of the heat exchanging double spiral pipe to constitute an outlet of a liquid refrigerant. The bottom heater for heating the evaporating vaporization chamber and the bottom temperature regulating unit are provided at a bottom surface of the bottom end plate. A second pipe joint and a third pipe joint are inserted through the top end plate or at the top of the evaporating vaporization chamber, and the second pipe joint is opened at one end inside the evaporating vaporization chamber and is connected at the other end to the second recovery and charging passage. The third joint is connected at one end to a top end of the central pipe of the heat exchanging double spiral pipe and is connected at the other end to the first condensed liquid pipe. The first recovery and charging passage is connected to the first pipe joint, and the fourth pipe joint is connected to the second condensed liquid pipe which leads to the recovery bomb.

According to the invention, the construction of the oil separator is such that the heat exchanging double spiral pipe in which the double pipe made of the central pipe and the external pipe is formed spirally about the vertical central axis of the oil separator is provided in a space below the separating wall, and the oil-containing refrigerant is passed through the external pipe from below the heat exchanging double spiral pipe, while the liquid refrigerant passed through the condenser is passed through the central pipe from above the heat exchanging double spiral pipe. Accordingly, while the oil-containing refrigerant is being passed through the external pipe, the oil-containing refrigerant is heat-exchanged to be heated by the heat exchanging double spiral pipe which is previously heated by the liquid refrigerant passed through the condenser. While the liquid refrigerant passed through the condenser is being passed through the central pipe, the liquid refrigerant passed through the condenser is heat-exchanged to be cooled by the heat exchanging double spiral pipe which is previously cooled by heat exchange with the oil-containing refrigerant. Since heat exchange is effected mutually between the central pipe and the external pipe in this manner, the entire heat exchange can be extremely economically effected to improve the yield of the liquid refrigerant.

According to the invention, the refrigerant processing apparatus includes: the oil separator; the oil recovery channel in which the remaining oil is recovered by heating with the heating unit; the refrigerant regeneration and recovery channel in which the gaseous refrigerant obtained by separating the oil-containing refrigerant and heating the oil-containing liquid refrigerant excluding the oil, and the gaseous refrigerant remaining after regeneration and recovery or being produced by vaporization are passed into the condenser, then the condensed liquid refrigerant from the condenser is passed through the central pipe from above the heat exchanging double spiral pipe and is regenerated as the liquid refrigerant, and then the regenerated liquid refrigerant is recovered into the recovery bomb; and the refrigerant charging channel for charging the collected equipment with the liquid refrigerant regenerated from the gaseous refrigerant. Accordingly, it is possible to extremely enhance the yield of a liquid refrigerant with respect to an oil-containing refrigerant to be recovered, which is transferred from the collected equipment.

Furthermore, in the case where the refrigerant regeneration and recovery channel is formed of two channels, the supply-side refrigerant regeneration and recovery channel and the circulation-side refrigerant regeneration and recovery channel, a gaseous refrigerant which cannot be fully regenerated by the supply-side refrigerant regeneration and recovery channel is circulated, reproduced and recovered by the circulation-side refrigerant regeneration and recovery channel. Accordingly, it is possible to recover a liquid refrigerant with extremely high yield, so that it is possible to prevent degradation of the cooling function and the mechanical durability of the collected equipment.

Part of the heat-exchanged oil-containing refrigerant is rapidly vaporized, while the remaining oil-containing refrigerant which is not yet vaporized drops to the bottom of the evaporating vaporization chamber. The remaining oil-containing refrigerant, because it is already heated, is rapidly vaporized excluding the oil by the heating unit and only the oil remains at the bottom. Because the interior of the oil separator becomes vacuum after the recovery of the liquid refrigerant, if an extremely small amount of gaseous refrigerant is transferred from above and the inner pressure of the oil separator is increased, the oil is ejected by a pressure difference when the oil drain valve at the bottom is undone. Accordingly, the oil can be easily taken out, and the gaseous refrigerant is hardly contained in an oil recovery container at the time of the completion of recovery and the amount of liquid refrigerant remaining in the oil can be extremely decreased.

In addition, according to the above-described construction, the gaseous refrigerant obtained by separation and heating in the oil separator and the remaining gaseous refrigerant as well as the gaseous refrigerant obtained by volatilization are all passed through the refrigerant charging channel, and therefore, do not at all lead to the release of a gaseous refrigerant into the air.

In addition, in the oil separator for the refrigerant processing apparatus according to the invention, the construction of the oil separator is such that the heat exchanging double spiral pipe in which the double pipe made of the central pipe and the external pipe is formed spirally about the vertical central axis of the oil separator is provided in a space below the separating wall, and the oil-containing refrigerant is passed through the external pipe from below the heat exchanging double spiral pipe, while the liquid refrigerant passed through the condenser is passed through the central pipe from above the heat exchanging double spiral pipe. Accordingly, while the oil-containing refrigerant is being passed through the external pipe, the oil-containing refrigerant is heat-exchanged to be heated by the heat exchanging double spiral pipe which is previously heated by the liquid refrigerant passed through the condenser. While the liquid refrigerant passed through the condenser is being passed through the central pipe, the liquid refrigerant passed through the condenser is heat-exchanged to be cooled by the heat exchanging double spiral pipe which is previously cooled by heat exchange with the oil-containing refrigerant. By effecting heat exchange mutually between the central pipe and the external pipe in this manner, it is possible to rapidly transfer a larger amount of the gaseous refrigerant to the compressor. In addition, in the case where the oil-containing refrigerant, after heat exchange, is vaporized by the heating unit such as the bottom heater at the bottom of the oil separator, since the oil-containing refrigerant is already heated by heat exchange, the liquid refrigerant can be economically vaporized in a short time, whereby it is possible to improve the efficiency of recovery, regeneration and charging of a refrigerant to be recovered.

In addition, the bottom end plate of the evaporating vaporization chamber is provided with the first pipe joint. The first pipe joint leads at one end to the branch passage constructed to switch between the first recovery and charging passage and the passage leading to the oil drain, and the other end of the first pipe joint is opened to the evaporating vaporization chamber as the port which serves as the oil outlet and the refrigerant inlet. The port and the external pipe of the heat exchanging double spiral pipe are formed as the recovery passage, and the first pipe joint is provided with the selector function valve which switches the flow passage to either one of the branch passage and the recovery passage. During the vaporized state of the liquid refrigerant, the remaining oil can be efficiently ejected, while when the regenerated liquid refrigerant is to be transferred to the collected equipment, the liquid refrigerant transferred from the circulation-side refrigerant regeneration and recovery channel can be efficiently ejected.

The fourth pipe joint is inserted through the bottom end plate and is connected to the bottom end of the central pipe of the heat exchanging double spiral pipe to constitute the outlet of the liquid refrigerant. The bottom heater for heating the evaporating vaporization chamber is provided at the bottom surface of the bottom end plate. The second pipe joint and the third pipe joint are inserted through the top end plate or at the top of the evaporating vaporization chamber, and the second pipe joint is opened at one end inside the evaporating vaporization chamber and is connected at the other end to the second recovery and charging passage. The third joint is connected at one end to the top end of the central pipe of the heat exchanging double spiral pipe and is connected at the other end to the first condensed liquid pipe. The first recovery and charging passage is connected to the first pipe joint, and the fourth pipe joint is connected to the second condensed liquid pipe which leads to the recovery bomb. The liquid refrigerant obtained by the condenser is passed through the central pipe from above the heat exchanging double spiral tube, whereby it is possible to construct a supply-side cooling and regeneration channel and to form part of a circulation-side cooling and regeneration channel. Accordingly, it is possible to provide an oil separator and a refrigerant processing apparatus both of which are extremely highly efficient.

In the invention, a float valve is used as the selector function valve which switches over the flow passage of the first pipe joint in the oil separator and the refrigerant processing apparatus, whereby the switching of the valve can be realized efficiently and economically.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

A refrigerant processing apparatus for collected equipment according to a first embodiment of the invention will be described below with main reference to FIGS. 1 to 3 and with illustrative reference to FIGS. 4 to 8. An oil separator for the refrigerant processing apparatus for collected equipment according to a second embodiment of the invention will be described later in due order with main reference to FIGS. 4 to 8 and FIGS. 13 and 14 and with illustrative reference to FIGS. 1 to 3. An arrangement in which an oil separator is connected to an existing refrigerant recovery system so that refrigerant regeneration and recovery and refrigerant charging can be effected will be described below with reference to FIGS. 9 to 12.

Figure 1:
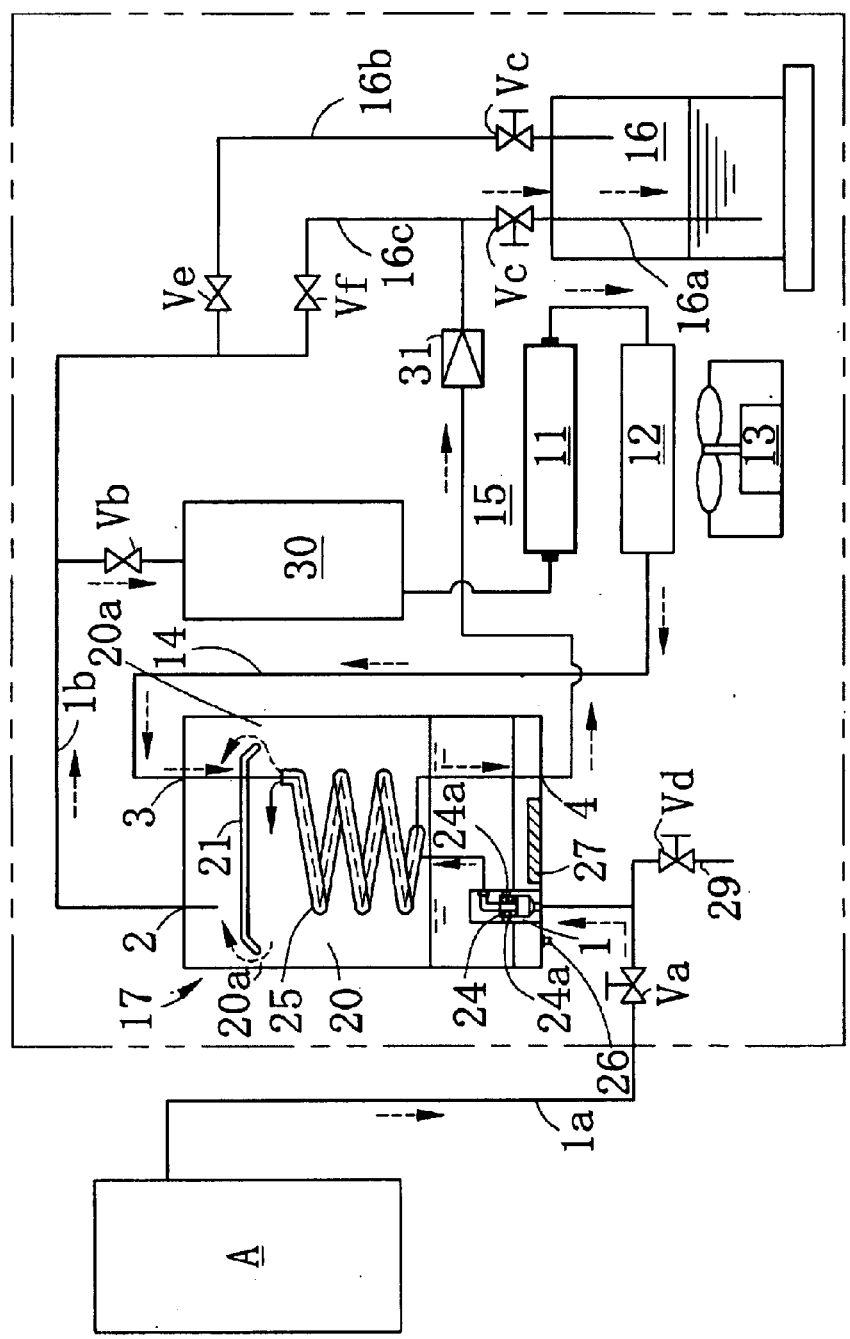
FIG. 1 is a system diagram showing the entire construction of a refrigerant processing apparatus for collected equipment according to a first embodiment of the invention, as well as a supply-side refrigerant generation and recovery state in the refrigerant processing apparatus.
Figure 2:
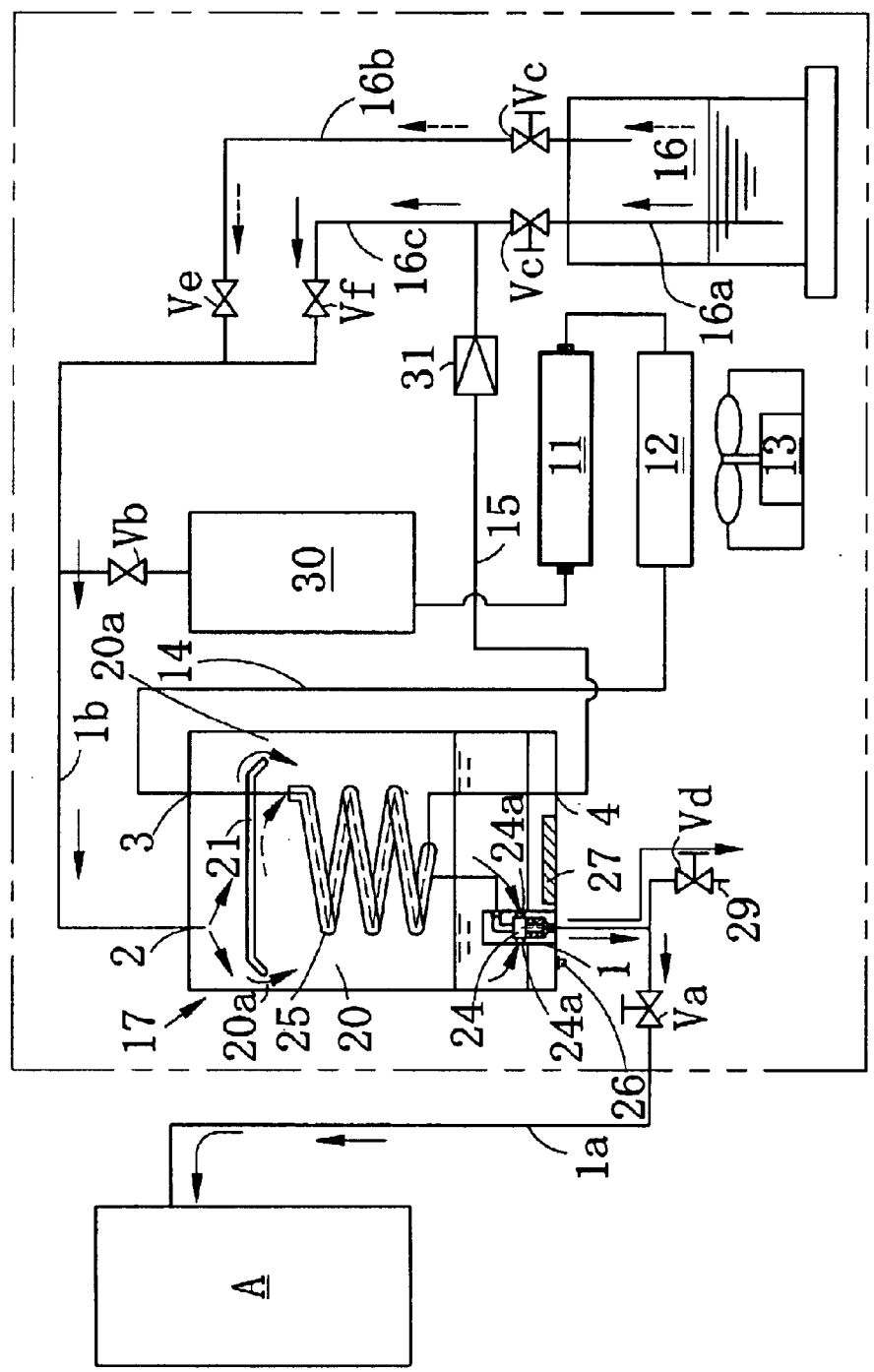
FIG. 2 is a system diagram of an oil recovery state and a refrigerant charging state.
Figure 3:
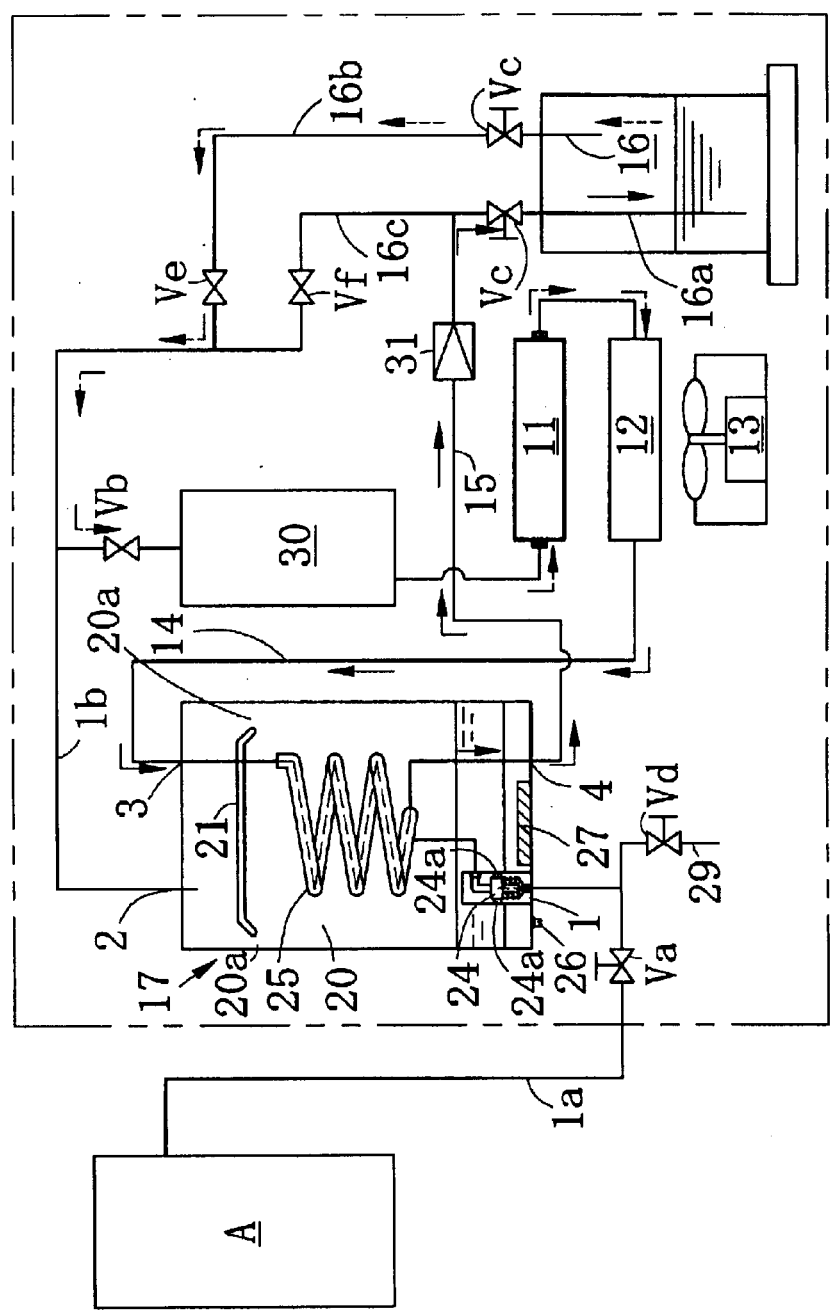
FIG. 3 is a system diagram of a circulation-side refrigerant regeneration state.
Figure 4:
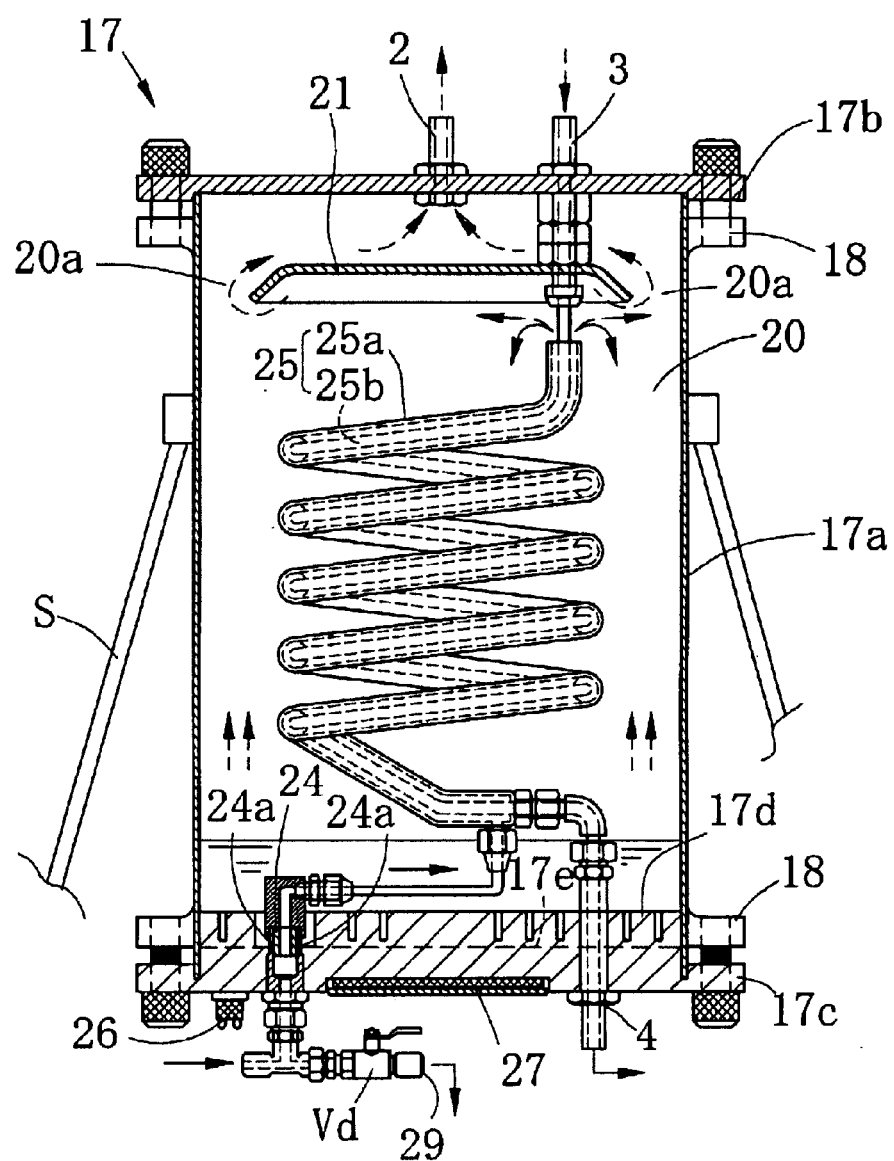
FIG. 4 is a cross-sectional schematic view of the construction of an oil separator in the circulation-side regeneration and recovery state.

FIGS. 1 to 3 show the construction and system of the refrigerant processing apparatus for collected equipment according to the first embodiment of the invention. FIG. 1 is a system diagram of a supply-side refrigerant regeneration and recovery state. FIG. 2 is a system diagram of a refrigerant charging state (the illustration of FIG. 2 will also be referred to in the description of an oil recovery state). FIG. 3 is a system diagram of a circulation-side refrigerant regeneration state. FIG. 4 is a cross-sectional schematic view of the construction of an oil separator 17 constructed to be connectable to an existing refrigerant recovery system B by piping. This oil separator 17 which also constitutes part of the refrigerant processing apparatus for collected equipment A according to the first embodiment will be described later with reference to FIG. 4.

(Refrigerant Processing Apparatus for Collected Equipment According to First Embodiment)

The refrigerant processing apparatus for collected equipment according to the first embodiment includes a refrigerant recovery system having a supply-side refrigerant regeneration and recovery channel (i.e., the refrigerant recovery channel referred to in the description of the publicly known art) in which a refrigerant containing the oil of the collected equipment A is sucked by a compressor 11 and after the oil has been separated by a separator 17 having a heating unit, the separated oil is recovered into a recovery bomb 16 as a liquid refrigerant by a condenser 12. In such refrigerant recovery apparatus for collected equipment, an oil recovery channel, a circulation-side refrigerant regeneration and recovery channel, and a refrigerant charging channel are connected to the supply-side refrigerant regeneration and recovery channel by piping so that the oil recovery channel, the circulation-side refrigerant regeneration and recovery channel, and the refrigerant charging channel are formed to share the supply-side refrigerant regeneration and recovery channel.

The oil separator 17 includes a separating wall 21 provided in a passage space 20a defined in an upper portion of the interior of a hermetically enclosed evaporating vaporization chamber 20, and a heat exchanging double spiral pipe 25 in which a double pipe made of a central pipe 25b and an external pipe 25a is formed spirally about a vertical central axis is provided in a space below the separating wall 21 so that the refrigerant containing the oil is made to collide with the separating wall 21 through the external pipe 25a from below the heat exchanging double spiral pipe 25 to separate the refrigerant into a gaseous refrigerant obtained by volatilization or evaporation and a liquid refrigerant containing the oil, a heating unit (bottom heater 27) for vaporizing the oil-containing liquid refrigerant excluding the oil, and a thermobreaker 26 which regulates the upper temperature limit of an aluminum-made bottom end plate 17c.

In this construction, the external pipe 25a through which the oil-containing refrigerant passes and the central pipe 25b through which the refrigerant passes are mutually heat-exchanged to heat the oil-containing refrigerant and cool the refrigerant passing through the central pipe 25b, thereby enabling efficient regeneration and recovery of the liquid refrigerant.

The circulation-side refrigerant regeneration and recovery channel is a channel through which to pass the liquid refrigerant recovered in the recovery bomb 16 through the space of the evaporating vaporization chamber 20 of the oil separator 17 and return the liquid refrigerant to the collected equipment A from the bottom of the oil separator 17. The oil recovery channel is a channel through which to recover the oil by means of an oil recovery unit provided at the bottom of the evaporating vaporization chamber 20. The refrigerant charging channel is a channel through which to return the liquid refrigerant recovered in the recovery bomb 16 to the condenser 12 and again recover the liquid refrigerant in the recovery bomb 16 through the central pipe 25b of the heat exchanging double spiral pipe 25.

The specific construction of each of the channels will be described below in detail.

As is apparent from the system diagram of FIG. 1, the supply-side refrigerant regeneration and recovery channel is constructed as a channel which specifically includes the collected equipment A, a first recovery and charging passage 1a provided with a suction rate regulating valve Va, the evaporating vaporization chamber 20 of the oil separator 17 provided with the heating unit (the bottom heater 27), a second recovery and charging passage 1b, an opening/closing valve Vb, a dry filter 30, the compressor 11 cooled by a cooling fan 13, the condenser 12, a first condensed liquid pipe 14, the heat exchanging double spiral pipe 25 of the oil separator 17, a second condensed liquid pipe 15 in which is inserted a check valve 31 which allows a condensed liquid refrigerant to pass in the recovery direction thereof, and a recovery charging pipe 16a provided with a opening/closing valve Vc. The oil recovery channel, the circulation-side refrigerant regeneration and recovery channel and the refrigerant charging channel are formed to be connected by piping to the supply-side refrigerant regeneration and recovery channel. In the supply-side refrigerant regeneration and recovery channel, a refrigerant containing an oil supplied into the evaporating vaporization chamber 20 is heat-exchanged by being passed through the external pipe 25a of the heat exchanging double spiral pipe 25 from the bottom of the evaporating vaporization chamber 20, and then the refrigerant collides with the separating wall 21 and is separated into a gaseous refrigerant and a mixture of a liquid refrigerant and the oil.

The oil-containing liquid refrigerant drops to the bottom of the evaporating vaporization chamber 20, and is separated into an upper layer containing the oil and a lower layer containing the liquid refrigerant, owing to the difference in specific gravity between the oil and the liquid refrigerant. The liquid refrigerant stored in the lower layer is brought into direct contact with the bottom end plate 17c heated by the bottom heater 27 provided at the bottom of the bottom end plate 17c, whereby the liquid refrigerant and the moisture contained in the liquid refrigerant are rapidly vaporized.

On the other hand, moisture is removed by the dry filter 30 from the gaseous refrigerant separated during the collision and the gaseous refrigerant produced by the heating and evaporation of the liquid refrigerant which has dropped to the bottom of the evaporating vaporization chamber 20, and the obtained gaseous refrigerant is transferred to the condenser 12 by the compressor 11 and is condensed into a liquid refrigerant. The obtained liquid refrigerant is transferred under pressure to the central pipe 25b of the heat exchanging double spiral pipe 25 in the oil separator 17, and in the central pipe 25b, the gaseous refrigerant remaining in the liquid refrigerant is cooled by a highly efficient heat exchange action, and the obtained liquid refrigerant is efficiently recovered into the recovery bomb 16 through the check valve 31 and the opening/closing valve Vc.

The oil-containing liquid refrigerant from the first recovery and charging passage 1a can also be introduced into the oil separator 17 after moisture has been removed from the oil-containing liquid refrigerant by means of a dry filter 30, as required.

Then, the oil recovery channel will be described below with reference to FIG. 2 which shows the refrigerant charging state. It is to be noted that although in FIG. 2 arrows indicative of the flow direction of the oil recovery channel are shown for the convenience of explanation, when an oil recovery valve Vd is open, the suction rate regulating valve Va is closed, whereas during charging, the oil recovery valve Vd is closed and the suction rate regulating valve Va is open.

The oil recovery channel is a channel in which the liquid refrigerant stored in the lower layer, which has been separated by the supply-side refrigerant regeneration and recovery channel and has dropped to the bottom of the evaporating vaporization chamber 20 owing to the difference in specific gravity, is vaporized and removed to separate the remaining oil and only the separated remaining oil is recovered into an oil recovery container (not shown) through the oil recovery valve Vd from a first pipe joint 1 provided with a selector function valve and disposed at the bottom end plate 17c provided at the bottom of the evaporating vaporization chamber 20.

Since the recovery of the oil from an oil drain 29 uses parts to be shared by liquid refrigerant charging, the oil recovery is carried out before refrigerant charging. The oil is recovered by being forced out by a slight refrigerant pressure which acts in the evaporating vaporization chamber 20 before refrigerant charging.

The refrigerant charging channel shown in FIG. 2 is constructed as a channel which connects either of passages constructed in bypass-like form to the second recovery and charging passage 1b of the supply-side refrigerant regeneration and recovery channel and leads from the evaporating vaporization chamber 20 of the oil separator 17 to the collected equipment A through the first recovery and charging passage 1a. The passages constructed in bypass-like form include a liquid refrigerant charging pipe 16c which is extended and connected to the recovery charging pipe 16a of the recovery bomb 16 and has a liquid refrigerant charging valve Vf inserted at its intermediate point, and a gaseous refrigerant regeneration pipe 16b which is disposed to extend from the recovery bomb 16 along the liquid refrigerant charging pipe 16c and has a gaseous refrigerant regeneration valve Ve inserted at its intermediate point.

The circulation-side refrigerant regeneration and recovery channel shown in FIG. 3 is constructed as a channel which connects the recovery bomb 16 to the inlet side of the opening/closing valve Vb on the outlet side of which the dry filter 30 is disposed, via the gaseous refrigerant regeneration pipe 16b provided with the gaseous refrigerant regeneration valve Ve, passes through the condenser 12, the first condensed liquid pipe 14, the heat exchanging double spiral pipe 25 of the oil separator 17 and the second condensed liquid pipe 15 in which is inserted the check valve 31 which allows a condensed liquid refrigerant to pass in the recovery direction, and leads to the recovery charging pipe 16a provided with the opening/closing valve Vc. During the use of the circulation-side refrigerant regeneration and recovery channel, the gaseous refrigerant in the recovery bomb 16 is sucked by the compressor 11 and the gaseous refrigerant regeneration valve Ve of the gaseous refrigerant regeneration pipe 16b provided on the recovery bomb 16 in bypass-like form is opened to return the gaseous refrigerant to the inlet side of the opening/closing valve Vb on the outlet side of which the dry filter 30 is disposed. The gaseous refrigerant is humidified by the dry filter 30 and transferred through the compressor 11 into the condenser 12, in which the gaseous refrigerant is condensed. The obtained liquid refrigerant is transferred under high pressure to the central pipe 25b of the heat exchanging double spiral pipe 25 in the oil separator 17 and is cooled by the heat exchange action of the heat exchanging double spiral pipe 25, and is efficiently recovered into the recovery bomb 16 through the opening/closing valve Vc as a liquid refrigerant of high liquid concentration (which means that the liquid refrigerant occupies the whole of the recovered refrigerant with a high ratio.)

Incidentally, in the invention, as the method of selectively controlling and carrying out the recovery, regeneration and charging processes of a refrigerant for collected equipment, it is also possible to utilize manual switching or switching using a timer or the like, or automatic sequence control including the utilization of a computer program or the installation of various sensors.

(Description of Oil Separator in Refrigerant Processing Apparatus)

As schematically shown in FIG. 1 and as shown in FIGS. 4 to 8 in detail, the oil separator 17 which is a part shared by each of the above-described channels includes as its body the evaporating vaporization chamber 20 made of a hollow body 17a which is closed at its top and bottom by a top end plate 17b and the bottom end plate 17c, respectively, and the separating wall 21 and the heat exchanging double spiral pipe 25 are provided in the interior of the evaporating vaporization chamber 20. The separating wall 21 is positioned below the top end plate 17b and is provided to define a passage space 20a between the top end plate 17b and the periphery of the separating wall 21. The heat exchanging double spiral pipe 25 includes the central pipe 25b which serves as a liquid refrigerant recovery passage, and the external pipe 25a which serves as a recovery passage to communicate with the first recovery and charging passage 1a during recovery, and the heat exchanging double spiral pipe 25 is formed spirally about the vertical central axis to prevent a refrigerant from staying in the heat exchanging double spiral pipe 25.

The bottom end plate 17c of the evaporating vaporization chamber 20 is provided with the first pipe joint 1, a fourth pipe joint 4, the bottom heater 27 and the thermobreaker 26. The first pipe joint 1 leads at one end to a branch passage constructed to switch between the first recovery and charging passage 1a and a passage leading to the oil drain 29, and the other end of the first pipe joint 1 is opened to the evaporating vaporization chamber 20 as a port 24a which serves as an oil outlet and a refrigerant inlet. The first pipe joint 1 has a selector function valve which switches a flow passage to either one of the branch passage and a recovery passage made of the port 24a and the heat exchanging double spiral pipe 25. The fourth pipe joint 4 which is connected to the bottom end of the central pipe 25b of the heat exchanging double spiral pipe 25 and serves as an outlet of a liquid refrigerant is inserted through the bottom end plate 17c, and the bottom heater 27 for heating the evaporating vaporization chamber 20 and the thermobreaker 26 for regulating the upper temperature limit of the bottom end plate 17c are provided at the bottom of the bottom end plate 17c.

A second pipe joint 2 and a third pipe joint 3 are inserted through the top end plate 17b or at the top of the evaporating vaporization chamber 20. The second pipe joint 2 is opened at one end in the interior of the evaporating vaporization chamber 20 and is connected at the other end to the second recovery and charging passage 1b. The third joint 3 is connected at one end to the central pipe 25b of the heat exchanging double spiral pipe 25 and is connected at the other end to the first condensed liquid pipe 14.

The first recovery and charging passage 1a which extends from the collected equipment A and has the suction rate regulating valve Va inserted at its intermediate point is connected to the first pipe joint 1, and the second condensed liquid pipe 15 having at its intermediate point the check valve 31 which allows only a flow in the direction of the recovery bomb 16 as described above is connected to the fourth pipe joint 4. The second condensed liquid pipe 15 is connected to the recovery bomb 16 via the recovery charging pipe 16a provided with the opening/closing valve Vc.

In the above-described refrigerant processing apparatus for collected equipment, first of all, the recovery of the refrigerant from the collected equipment A is carried out with the supply-side refrigerant regeneration and recovery channel. More specifically, as shown in FIG. 1, the oil-containing refrigerant passed through the first recovery and charging passage 1a connected to the collected equipment A is sucked into the evaporating vaporization chamber 20 with the oil separator 17 heated, by the suction of the compressor 11, via the first pipe joint 1 provided with the selector function valve, through a float valve which, during its float-raised state, is cut off from the evaporating vaporization chamber 20 and is connected to the external pipe 25a of the heat exchanging double spiral pipe 25, after moisture has been removed from the refrigerant by the dry filter 30, as required.

The heat exchanging double spiral pipe 25 of the oil separator 17 is constructed so that the oil-containing refrigerant passes into the external pipe 25a from below the heat exchanging double spiral pipe 25, while the liquid refrigerant passed through the condenser 12 passes into the central pipe 25b from above the heat exchanging double spiral pipe 25. While the oil-containing refrigerant is being passed into the external pipe 25a, the temperature near the third joint 3 which lies the outlet side of the compressor 11 is high, and the temperature becomes lower from the third joint 3 toward the fourth pipe joint 4 via the central pipe 25b. Accordingly, the oil-containing refrigerant supplied from below the external pipe 25a of the heat exchanging double spiral pipe 25 is gradually heated by heat exchange with the central pipe 25b of the heat exchanging double spiral pipe 25 and the like, and promotes and accelerates the vaporization of the oil-containing refrigerant. While the refrigerant is being passed into the central pipe 25b from the third joint 3, the portion from the third joint 3 to the fourth pipe joint 4 is cooled by the passage of the oil-containing refrigerant, whereby the efficiency of liquefaction of the refrigerant is enhanced.

Incidentally, as the temperature of the gaseous refrigerant becomes lower, the inner pressure of the recovery bomb 16 becomes lower, whereby the recovery of the refrigerant into the recovery bomb 16 can be made far easier.

The oil-containing refrigerant supplied into the evaporating vaporization chamber 20 collides with the separating wall 21 through the external pipe 25a of the heat exchanging double spiral pipe 25 provided in the interior of the evaporating vaporization chamber 20, and is separated into the gaseous refrigerant and the liquid refrigerant. The liquid refrigerant and the oil drop to the bottom of the evaporating vaporization chamber 20, and are brought to the state of being separated in layered form owing to the difference in specific gravity between the oil and the liquid refrigerant.

At this time, the oil and the liquid refrigerant are in the state of being heated by the heat exchanging double spiral pipe 25. After that, the liquid refrigerant is easily completely vaporized by being heated by the bottom heater 27 provided at the bottom end plate 17c made of aluminum, and only the oil remains at the bottom of the evaporating vaporization chamber 20.

Incidentally, during heating by the bottom heater 27, the thermobreaker 26 provided at the bottom end plate 17c regulates the temperature to prevent the temperature from rising above 40° C. The reason why the material of the bottom end plate 17c is aluminum is that it is preferable to use a material having a good temperature accumulation effect and thermal conductivity.

The gaseous refrigerant separated during the collision and the gaseous refrigerant (which contains moisture) vaporized by the heating of the bottom heater 27 pass from the second pipe joint 2 of the top end plate 17b through the second recovery and charging passage 1b and the opening/closing valve Vb, and after moisture has been removed by the dry filter 30, the obtained gaseous refrigerant is transferred by the compressor 11 to the condenser 12 cooled by the cooling fan 13, and is condensed into a liquid refrigerant. The obtained liquid refrigerant is transferred under high pressure from the first condensed liquid pipe 14 to the central pipe 25b of the heat exchanging double spiral pipe 25 in the oil separator 17, and in the central pipe 25b, the gaseous refrigerant remaining in the liquid refrigerant is liquefied by cooling with a heat exchange action as described above. The obtained liquid refrigerant reaches the fourth pipe joint 4 and is recovered into the recovery bomb 16 via the opening/closing valve Vc through the second condensed liquid pipe 15 which is connected to the fourth pipe joint 4 and in which is inserted the check valve 31 which allows only a flow in the recovery direction of the recovery bomb 16.

The recovery of the oil from the oil drain 29 is, as described previously, carried out before refrigerant charging. When the suction by the compressor 11 is completed and the float valve falls to a position where oil recovery is possible, the suction rate regulating valve Va of the first recovery and charging passage 1a is closed and the oil recovery valve Vd is opened, and only the oil separated and stayed in the evaporating vaporization chamber 20 (the liquid refrigerant is evaporated by heating and does not remain in the evaporating vaporization chamber 20) is recovered into the oil recovery container (not shown) by being forced out of the first pipe joint 1 provided at the bottom end plate 17c and provided with the selector function valve, by the action of a slight refrigerant pressure.

In the case where moisture and the gaseous refrigerant are contained in the gaseous refrigerant recovered from the collected equipment A by the above-described channel, if such gaseous refrigerant is charged into the collected equipment A without modification, the collected equipment A is degraded in cooling function and mechanical durability. Therefore, it is necessary to charge the liquid refrigerant into the collected equipment A with the moisture and the gaseous refrigerant removed as completely as possible. For this purpose, the dry filter 30 for humidification is provided on the suction side of the opening/closing valve Vb of the compressor 11 so that the liquid refrigerant is humidified. The dry filter 30 is not necessarily needed, but for the above-described reason, it is preferable to use the dry filter 30.

The regeneration of the refrigerant in the recovery bomb 16 that needs to be executed in the above-described refrigerant process is carried out as shown in FIG. 3. The gaseous refrigerant in the recovery bomb 16 is sucked by the compressor 11 with the flow in the second recovery and charging passage 1b cut off by the suction rate regulating valve Va, and is returned to the inlet side of the opening/closing valve Vb on the outlet side of which the dry filter 30 is disposed, from the gaseous refrigerant regeneration pipe 16b provided on the recovery bomb 16 in bypass-like form and provided with the opening/closing valve Vc and the liquid refrigerant regeneration valve Ve. The gaseous refrigerant is humidified by the dry filter 30 and transferred through the compressor 11 into the condenser 12, in which the gaseous refrigerant is condensed. The obtained liquid refrigerant is transferred under pressure from the first condensed liquid pipe 14 to the central pipe 25b of the heat exchanging double spiral pipe 25 in the oil separator 17 and is cooled by the heat exchange action of the heat exchanging double spiral pipe 25. The cooled liquid refrigerant is highly efficiently recovered into the recovery bomb 16 through the fourth pipe joint 4 and the second condensed liquid pipe 15 in which the check valve 31 is inserted, via the opening/closing valve Vc.

The charging of the highly efficiently recovered liquid refrigerant into the collected equipment A is carried out through the refrigerant charging channel which is formed so that the liquid refrigerant in the recovery bomb 16 is directly transferred to the evaporating vaporization chamber 20 of the oil separator 17 and is charged into the collected equipment A from the bottom of the evaporating vaporization chamber 20.

(Oil Separator)

An oil separator according to the second embodiment of the invention will be described below with reference to FIGS. 4 to 8.

Figure 5:
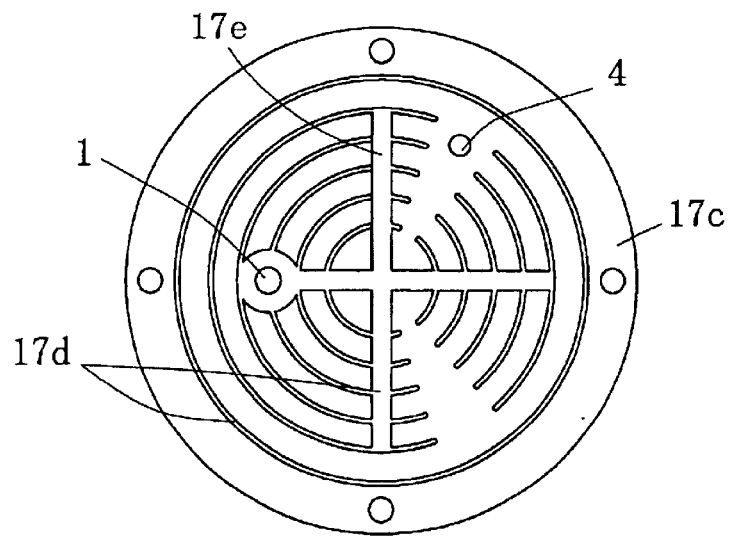
FIG. 5 is a plan view of a bottom end plate which constitutes the body of an evaporating vaporization chamber.
Figure 6:
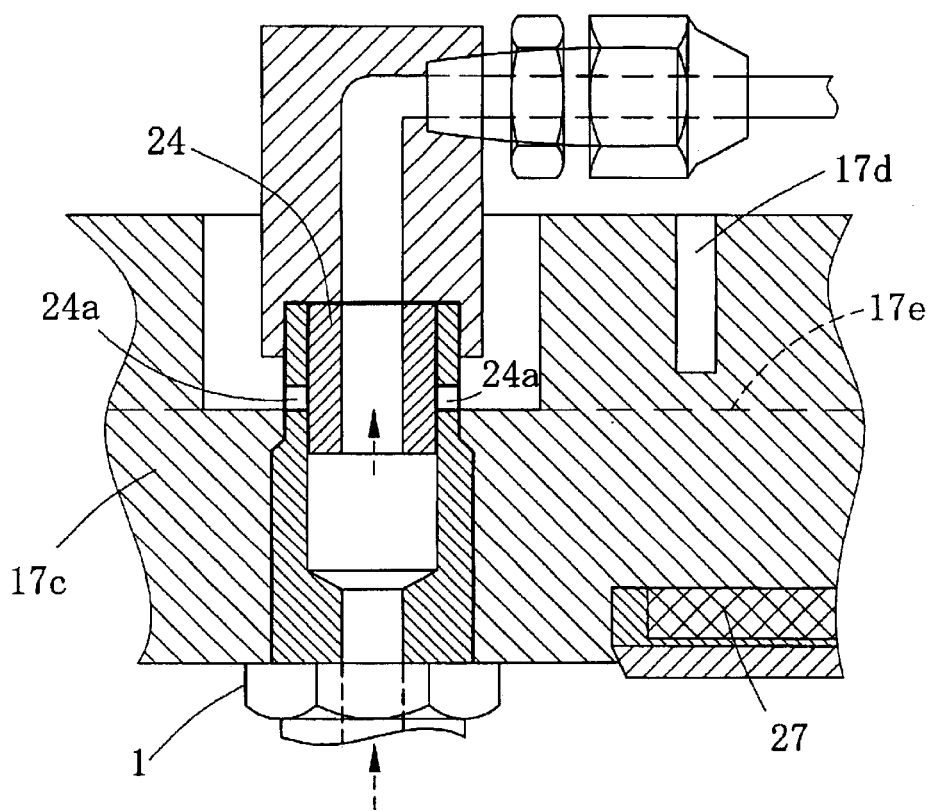
FIG. 6 is an enlarged cross-sectional explanatory view showing a float valve of the bottom end in the supply-side refrigerant regeneration and recovery state.
Figure 7:
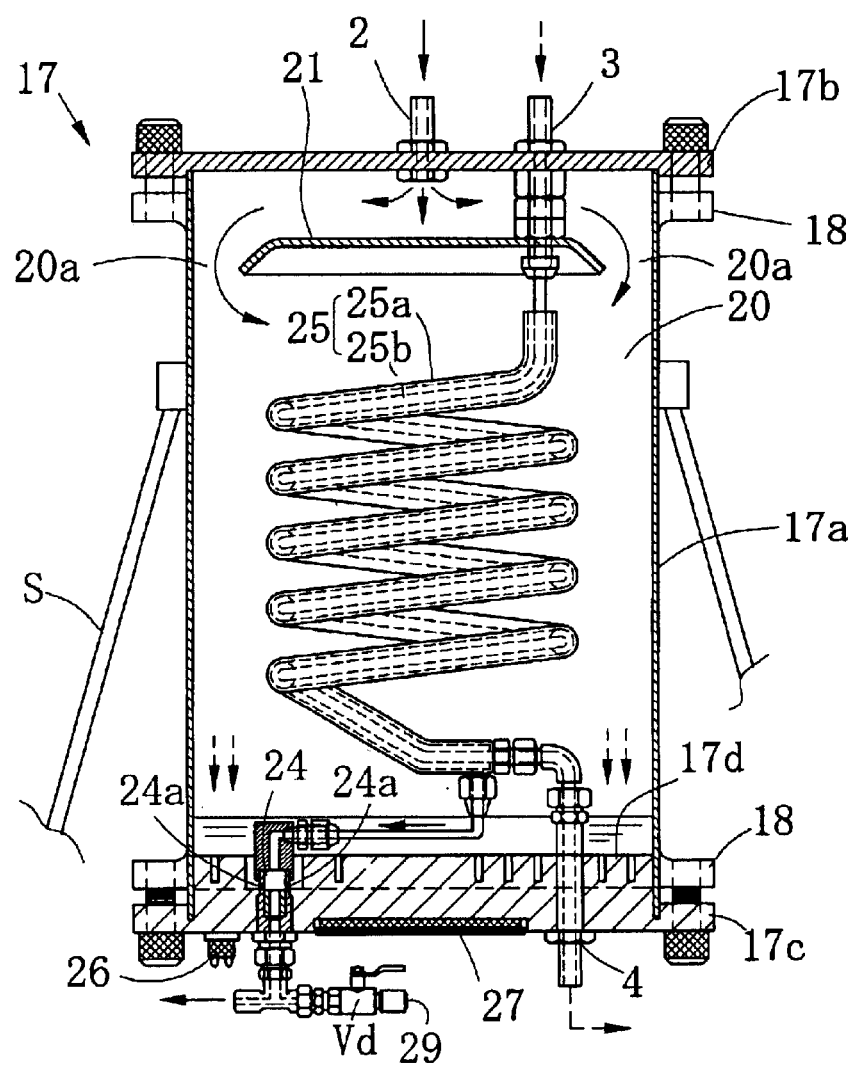
FIG. 7 is a cross-sectional schematic view of the construction of the oil separator, showing a refrigerant charging direction and an oil recovery direction.
Figure 8:
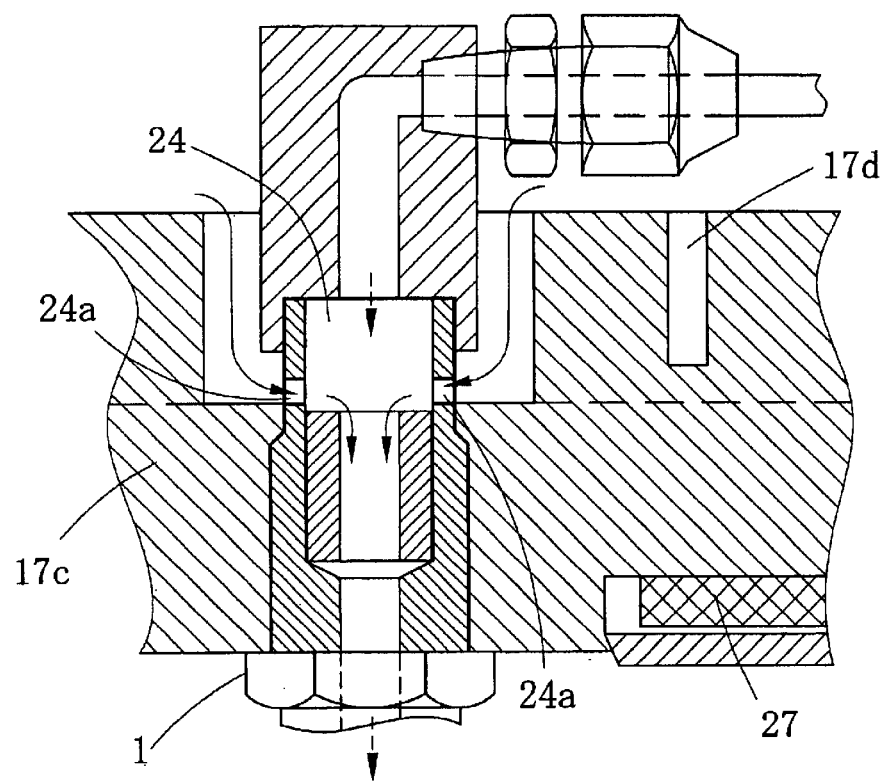
FIG. 8 is an enlarged cross-sectional explanatory view of the float valve, showing the refrigerant charging direction and the oil recovery direction.
Figure 9:
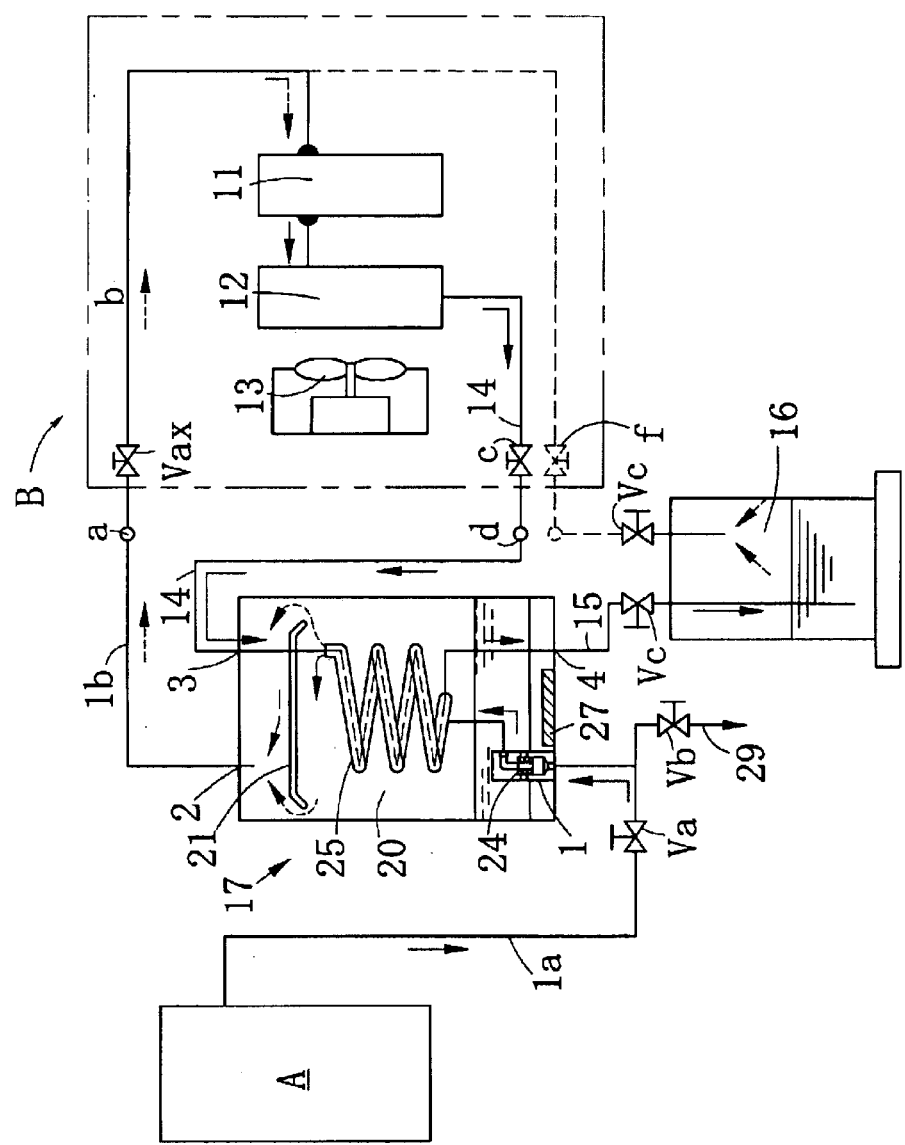
FIG. 9 is a system diagram showing an oil separator according to a second embodiment of the invention as well as the connection construction between the oil separator and an existing refrigerant recovery apparatus.
Figure 10:
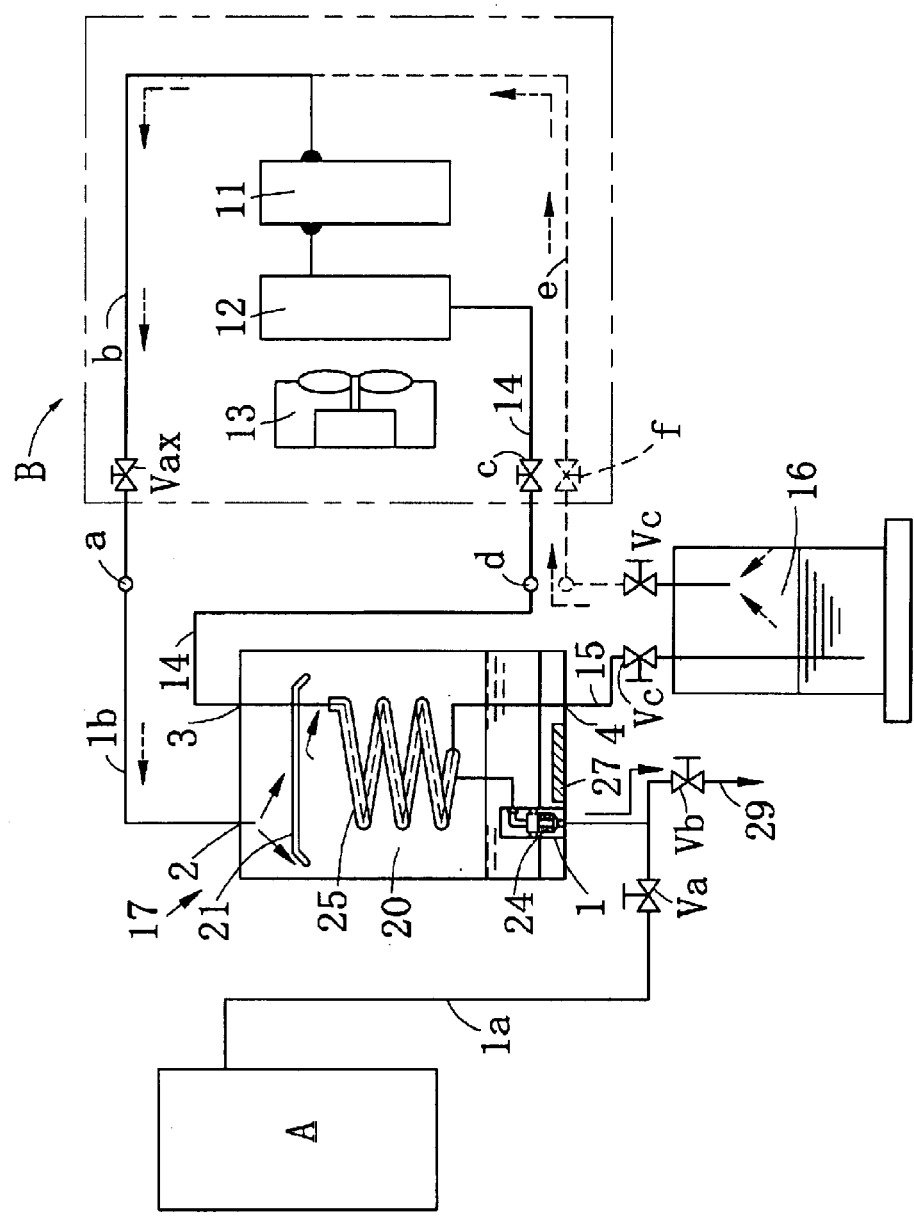
FIG. 10 is a system diagram showing the case where the oil separator according to the second embodiment and the existing refrigerant processing apparatus are connected to each other to force out the oil by the action of a gaseous refrigerant pressure.
Figure 11:
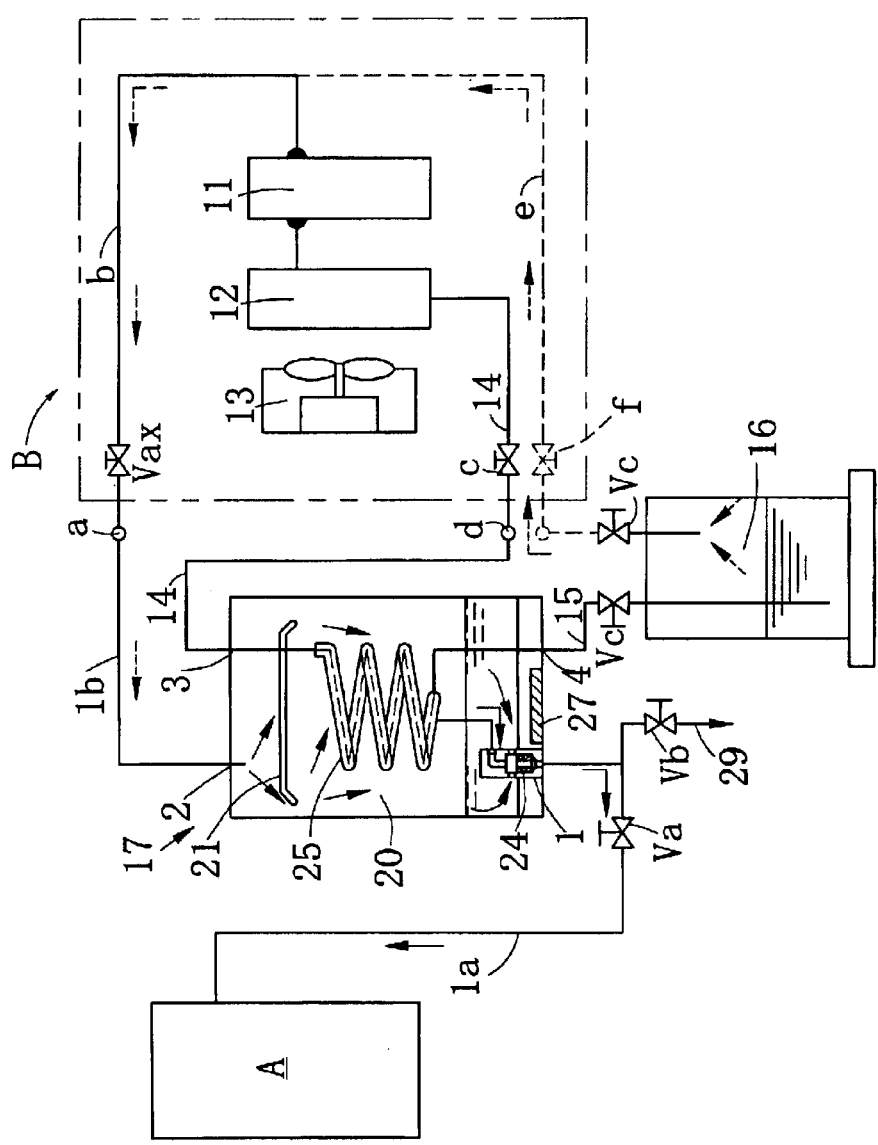
FIG. 11 is a system diagram showing the recovery of a refrigerant into collected equipment and an oil recovery direction.

The construction of the oil separator has been described above in detail in "DESCRIPTION OF OIL SEPARATOR IN REFRIGERANT PROCESSING APPARATUS" of the above description of the refrigerant processing apparatus for collected equipment as well as with reference to the cross-sectional schematic views of FIGS. 4 to 6. Although a considerable part of the above description is repeated, the internal construction of the bottom end plate 17c, the selector function valve which is secured to the bottom end plate 17c and serves to change the flow passage of the first pipe joint 1, and the relationship of the oil separator to the existing refrigerant processing apparatus shown in FIG. 11 as one example will be more clearly described below. In addition, the flow and regeneration of the refrigerant in the case of recovery in the oil separator as well as the flow of the refrigerant in the case of charging will be described below in detail with reference to FIGS. 3 to 8, and the case where the oil separator is connected by piping to the existing refrigerant processing apparatus shown in FIG. 11 so that the refrigerant can be recovered, regenerated and charged as shown in FIGS. 9 to 11 will also be described below. The oil separator according to the second embodiment can also serve remarkable effects and advantages, such as highly efficient heat exchange, which are similar to those described in "DESCRIPTION OF OIL SEPARATOR IN REFRIGERANT PROCESSING APPARATUS."

FIG. 4 is a schematic cross-sectional view showing the flow of the refrigerant in the case of refrigerant recovery as well as the construction of the oil separator.

Mounting flanges 18 are respectively provided at the top and bottom peripheries of the hollow body 17a and support stands S are provided on the periphery of the hollow body 17a, and the top end plate 17b and the bottom end plate 17c are secured to the respective mounting flanges 18 to close the hollow body 17a, thereby forming the evaporating vaporization chamber 20 as the body of the oil separator 17.

The separating wall 21 and the heat exchanging double spiral pipe 25 are provided in the interior of the evaporating vaporization chamber 20 which is the body of the oil separator 17. The separating wall 21 is positioned below the top end plate 17b and is provided to define the passage space 20a between the top end plate 17b and the periphery of the separating wall 21. The heat exchanging double spiral pipe 25 includes the central pipe 25b which serves as a liquid refrigerant recovery passage, and the external pipe 25a which serves as a recovery passage to communicate with the first recovery and charging passage 1a during recovery. The heat exchanging double spiral pipe 25 is constructed to form a recovery flow which passes through the external pipe 25a from above to below as well as a cooling flow in which a condensed liquefied refrigerant flows from above to below through the central pipe 25b of the heat exchanging double spiral pipe 25, so that the condensed liquefied refrigerant is cooled while passing through the central pipe 25b, thereby improving the yield of the liquid refrigerant.

As is apparent from the cross-sectional schematic construction view of FIG. 4, FIG. 5 which is a plan view showing the bottom end plate, and FIG. 6 which is a cross-sectional view of a portion including the first pipe joint 1, the bottom heater 27 for heating the evaporating vaporization chamber 20 and the thermobreaker 26 for regulating the temperature of the bottom end plate 17c are provided at the bottom surface of the bottom end plate 17c made of aluminum. The guide groove 17d which serves to guide the discharge of the oil from the evaporating vaporization chamber 20 or to guide a refrigerant during charging is provided on the inner surface of the bottom end plate 17c opposite to the bottom surface. The first pipe joint 1 and the fourth pipe joint 4 are inserted through the bottom end plate 17c.

The first pipe joint 1 leads at one end to a branch passage constructed to switch between the first recovery and charging passage 1a and a passage leading to the oil drain 29, and the other end of the first pipe joint 1 is opened to the evaporating vaporization chamber 20 as the port 24a which serves as an oil outlet and a refrigerant inlet. The first pipe joint 1 has a float valve 24 which serves as a selector function valve which switches a flow passage to either one of the port 24a and the recovery passage of the heat exchanging double spiral pipe 25.

The float valve 24 has a passage formed in its center. As shown in FIG. 8 the float valve 24 is normally placed owing to its own weight in the state of opening the port 24a to the evaporating vaporization chamber 20. During refrigerant recovery, as shown in FIG. 5, the float valve 24 rises to close the port 24a of a valve chamber owing to the flow of a fluid and allows a refrigerant to be recovered to pass into the external pipe 25a of the heat exchanging double spiral pipe 25. During oil recovery and refrigerant charging, as shown in FIG. 8, the float valve 24 falls to open the port 24a owing to its own weight and transfer the oil remaining in the bottom portion of the evaporating vaporization chamber 20 to the oil recovery container through the oil drain 29 and the oil recovery valve Vd. During refrigerant charging, the oil recovery valve Vd is closed, and the float valve 24 allows a liquid refrigerant to pass through the suction rate regulating valve Va and be charged into the collected equipment A (refer to FIG. 3).

The fourth pipe joint 4 is arranged to communicate with the central pipe 25b of the heat exchanging double spiral pipe 25, and this fourth pipe joint 4 is connected to the recovery bomb 16 by piping.

As described previously, the second pipe joint 2 and the third pipe joint 3 are inserted through the top end plate 17b of the evaporating vaporization chamber 20. The second pipe joint 2 is opened at one end in the interior of the evaporating vaporization chamber 20 and is connected at the other end to the second recovery and charging passage 1b. The third joint 3 is connected at one end to the central pipe 25b of the heat exchanging double spiral pipe 25 in the interior of the evaporating vaporization chamber 20 and is connected at the other end to the first condensed liquid pipe 14 (refer to FIG. 1).

Figure 12:
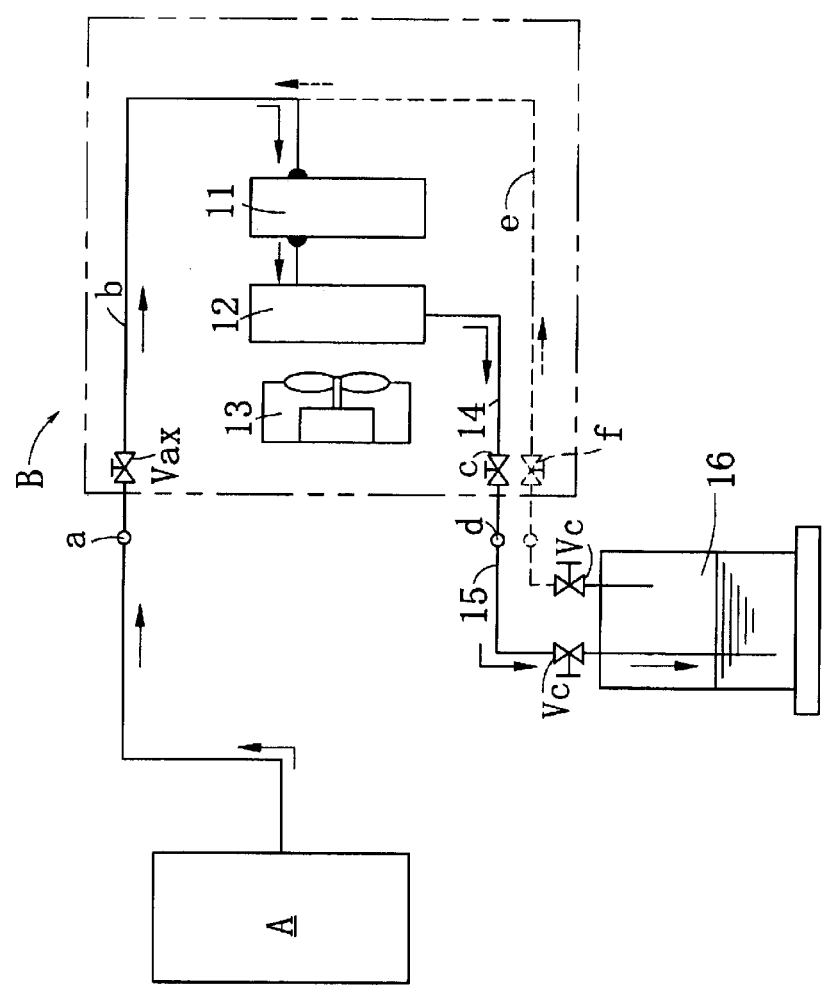
FIG. 12 is a system diagram showing one example of the existing refrigerant processing apparatus to be connected by piping to the oil separator according to the invention.

The oil separator constructed in the above-described manner is used to be connected by piping to the existing refrigerant recovery system B shown in FIG. 12 by way of example. This arrangement will be described below with reference to FIGS. 9 to 12.

The refrigerant recovery system B shown in FIG. 12 is exclusively constructed to recover a refrigerant and charge the recovered refrigerant into the collected equipment A as a gaseous refrigerant. The refrigerant recovery system B has a construction in which the collected equipment A, a pipe port a, a recovery passage b provided with a suction rate regulating valve Vax, the compressor 11, the condenser 12 cooled by the cooling fan 13, a condensed refrigerant outlet d formed in the first condensed liquid pipe 14 in which an opening/closing valve c is inserted, and the recovery bomb 16 provided with the opening/closing valve Vc are connected by piping in that order. The recovery bomb 16 and the suction side of the compressor 11 are connected via an opening/closing valve f through a charging passage e connected to the recovery passage b to be used for charging the collected equipment A with a gaseous refrigerant.

The existing refrigerant recovery system B and the oil separator according to the invention are connected by piping as shown in FIG. 9. The second recovery and charging passage 1b of the oil separator is connected to the pipe port a of the existing refrigerant recovery system B, and the first condensed liquid pipe 14 which leads to the third pipe joint 3 of the oil separator is connected to the condensed refrigerant outlet d of the existing refrigerant recovery system B, and the central pipe 25b of the heat exchanging double spiral pipe 25 extending from the third pipe joint 3 is connected to the recovery bomb 16 having the opening/closing valve Vc, via the fourth pipe joint 4 which communicates with the central pipe 25b.

FIG. 10 shows an oil recovery state. After an oil opening/closing valve Vb of the oil recovery channel of the oil separator has been opened, the gaseous refrigerant in the recovery bomb 16 is returned to the evaporating vaporization chamber 20 through the opening/closing valve Vc and the second recovery and charging passage 1b, and the oil is recovered by the obtained gas pressure into the oil recovery container (not shown) through the oil opening/closing valve Vb.

In the case where the gaseous refrigerant in the recovery bomb 16 is to be charged into the collected equipment A as shown in FIG. 11, after the oil in the evaporating vaporization chamber 20 has been recovered, the oil opening/closing valve Vd of the oil recovery channel is closed to place the first recovery and charging passage 1a into communication with the collected equipment A, thereby charging the gaseous refrigerant into the collected equipment A.

In accordance with the oil separator according to the invention, the recovery of the refrigerant from the collected equipment A, the recovery of the oil, and the charging of the collected equipment A with the recovered refrigerant can be effected effectively and reliably with the oil separator connected to the existing refrigerant recovery system B. Accordingly, it is possible to efficiently recover the refrigerant as well as to recover the oil and charge the recovered refrigerant into the collected equipment A, without causing the release of a gaseous refrigerant into the air. In addition, it is possible to use the existing refrigerant recovery system B for a long term without the need for wasteful disposal of the existing refrigerant recovery system B.

Although not shown, a recovery passage passing from the recovery bomb 16 of the existing refrigerant recovery system B to the second recovery and charging passage 1b may also be formed similarly to the case of the above-described refrigerant processing apparatus for collected equipment. In this case, the gaseous refrigerant in the recovery bomb 16 is returned to the inlet side of the opening/closing valve Vb on the outlet side of which the dry filter 30 is disposed, through the recovery charging pipe 16a and the gaseous refrigerant regeneration pipe 16b both of which are provided on the recovery bomb 16 in bypass-like form and are respectively provided with the opening/closing valves Vc, and then the dried gaseous refrigerant is transferred to the condenser 12 through the compressor 11, or the gaseous refrigerant in the recovery bomb 16 is directly transferred to the condenser 12 by the compressor 11. After the gaseous refrigerant has been condensed in the condenser 12, the obtained liquid refrigerant is transferred under pressure from the first condensed liquid pipe 14 to the central pipe 25b of the heat exchanging double spiral pipe 25 in the oil separator 17 and is cooled by the heat exchange action of the heat exchanging double spiral pipe 25. The cooled liquid refrigerant is recovered into the recovery bomb 16 through the fourth pipe joint 4 and the second condensed liquid pipe 15 in which the check valve 31 is inserted, via the opening/closing valve Vc. In this case, it is possible to recover the liquid refrigerant with high yield and charge the recovered refrigerant into the collected equipment A highly efficiently.

Figure 13:
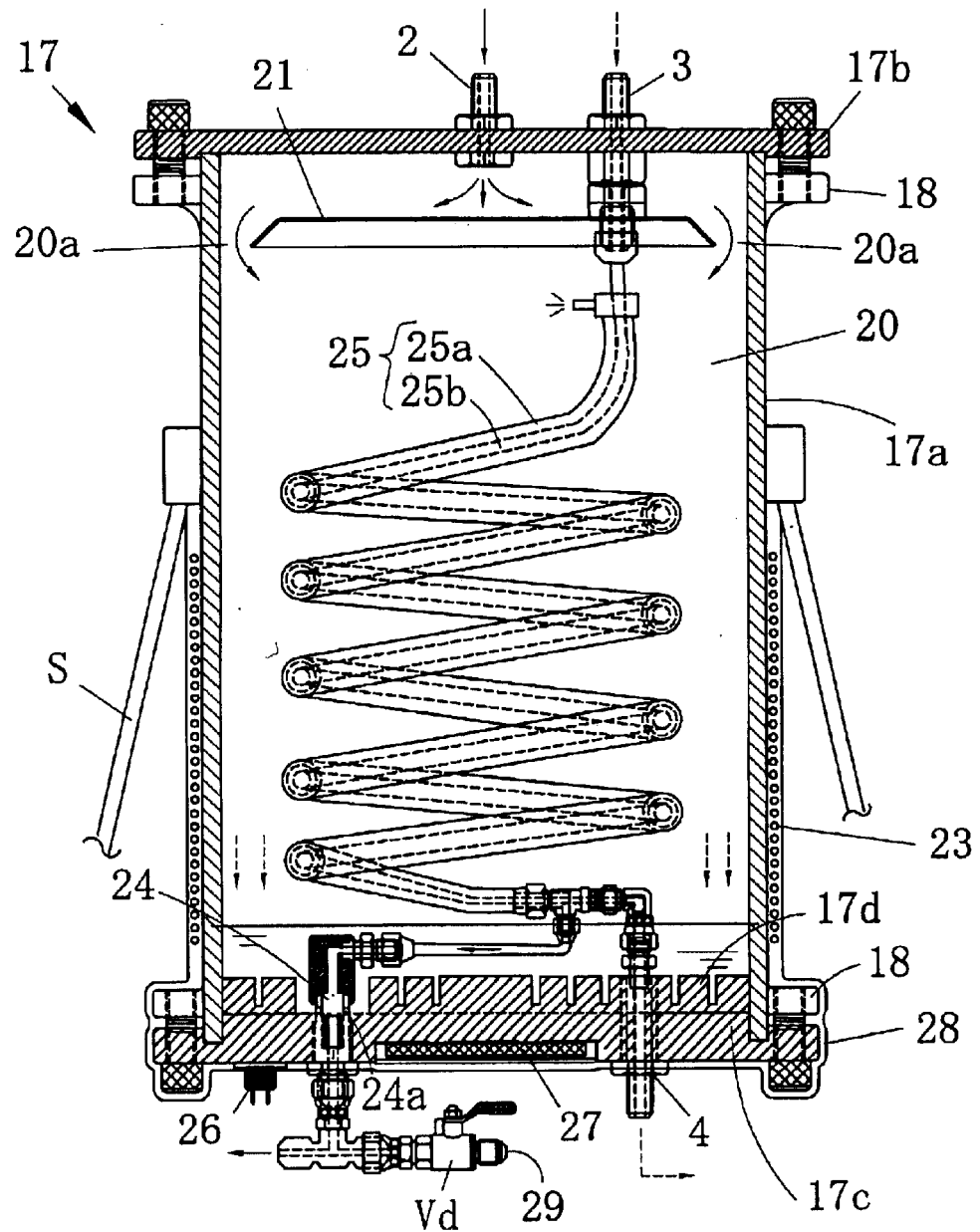
FIG. 13 is a cross-sectional schematic view of the construction of an oil separator according to a third embodiment of the invention.

FIG. 13 shows an oil separator according to a third embodiment of the invention. As shown in FIG. 13, the basic construction of the oil separator is similar to that of the oil separator according to the second embodiment. An external heater is made of a heating wire wrapped in coiled form around the hollow body 17a from the bottom to a peripheral portion which is near the middle of the hollow body 17a, and the external heater, together with the bottom of the hollow body 17a, is covered with a heat insulating material. In this manner, by using the external heater, it is possible to improve the efficiency of vaporization of the liquid refrigerant and enhance the rate of recovery of the refrigerant.

Figure 14:
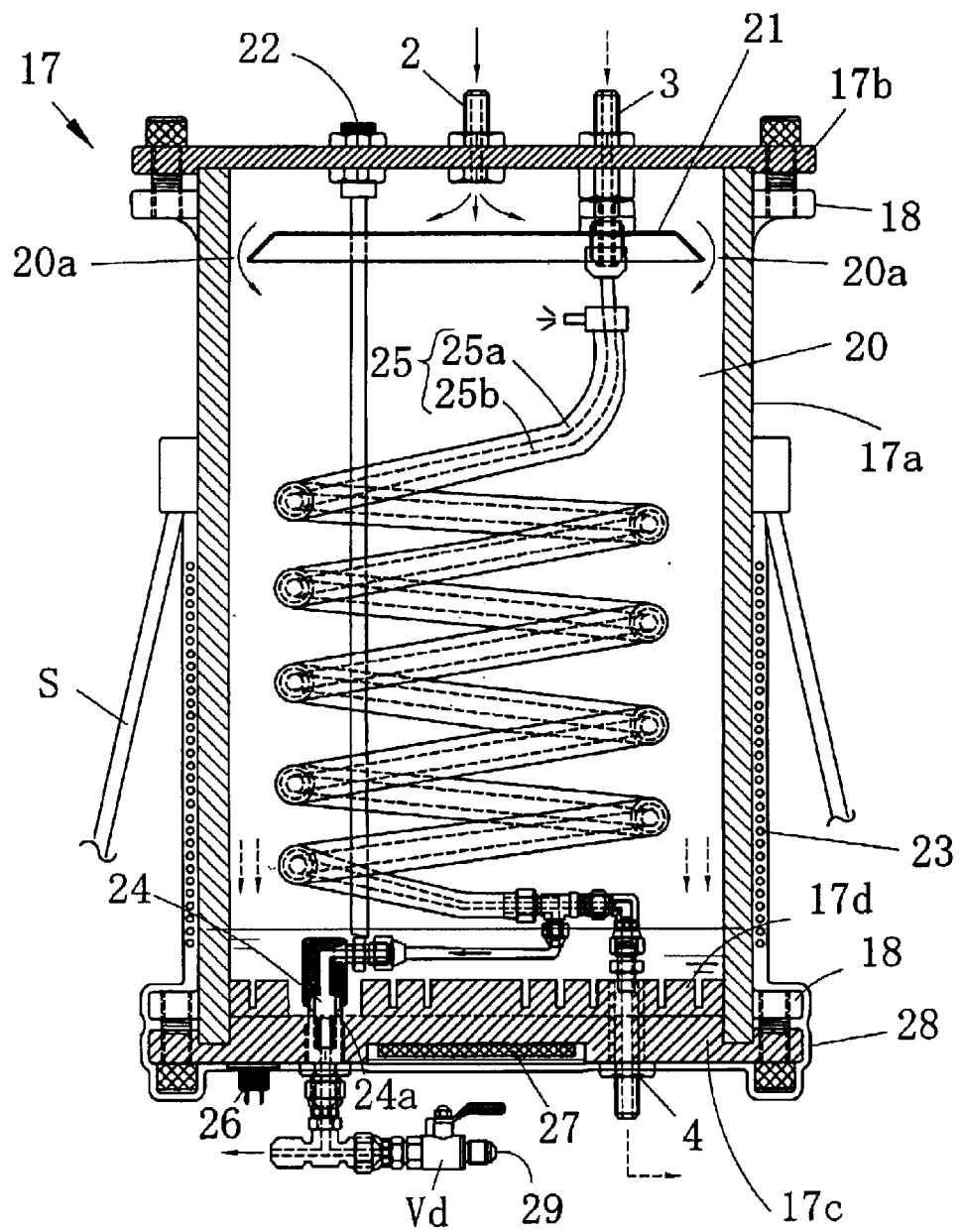
FIG. 14 is a cross-sectional schematic view of the construction of an oil separator according to a fourth embodiment of the invention.
Figure 15:
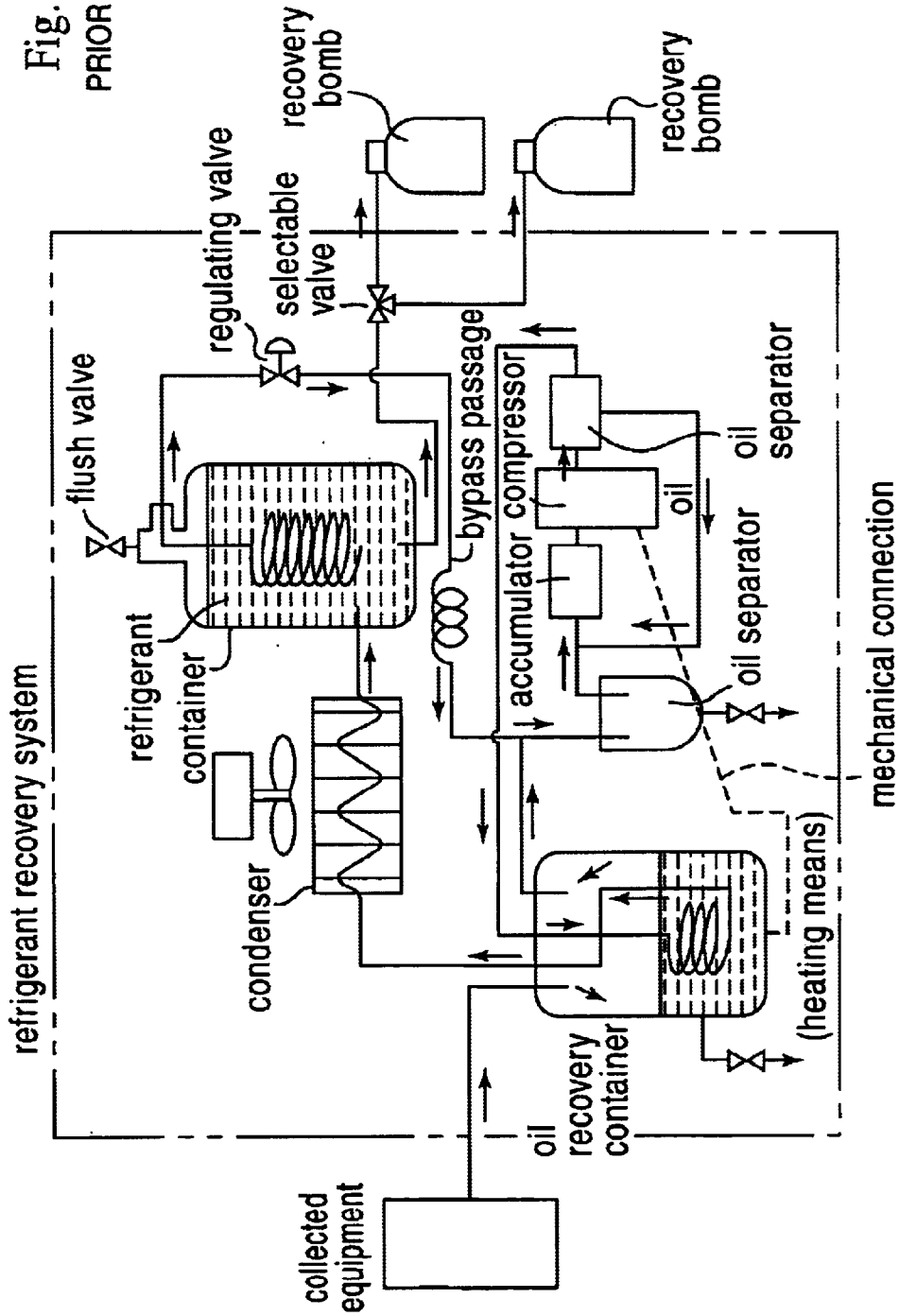
FIG. 15 is a system diagram of a refrigerant recovery apparatus according to a representative publicly known invention.

FIG. 14 shows a fourth embodiment. As shown in FIG. 14, in the case where the throughput of a recovered refrigerant is large, a sheath heater 22 may be provided so that the vaporization of a liquid refrigerant can be promoted. In the oil separator according to the fourth embodiment, the heat exchanging double spiral pipe 25 is disposed to extend downward from the top end plate 17b, but the manner of installation of the sheath heater 22 can be freely set within the range of design change and two or more sheath heaters 22 may also be provided.

Incidentally, the construction of the oil separator according to each of the third and fourth embodiments may also be used for the oil separator in the refrigerant recovery system according to the invention.

What is claimed is:

1. A refrigerant processing apparatus for collected equipment, for use in a refrigerant recovery system in which an oil-containing refrigerant to be recovered is sucked from collected equipment by a compressor and after an oil has been separated from the oil-containing refrigerant by an oil separator having a heater unit, a resultant refrigerant is regenerated as a liquid refrigerant by a condenser and is recovered into a recovery bomb, the refrigerant processing apparatus for collected equipment comprising:

the oil separator having a construction provided with:

a separating wall provided in a passage space defined in an upper portion inside a hermetically enclosed evaporating vaporization chamber;

a heat exchanging double spiral pipe in which a double pipe made of a central pipe and an external pipe is formed spirally about a vertical central axis, the heat exchanging double spiral pipe being provided in a space below the separating wall, the oil-containing refrigerant being made to collide with the separating wall through the external pipe from below the heat exchanging double spiral pipe to separate the oil-containing refrigerant into a gaseous refrigerant obtained by volatilization or evaporation and an oil-containing liquid refrigerant; and a heating unit for vaporizing the oil-containing liquid refrigerant excluding the oil;

an oil recovery channel in which a remaining oil is recovered by heating with the heating unit;

a refrigerant regeneration and recovery channel in which a gaseous refrigerant obtained by separating the oil-containing refrigerant and heating the oil-containing liquid refrigerant excluding the oil, and a gaseous refrigerant remaining after regeneration and recovery or being produced by vaporization are passed into a condenser; then a condensed liquid refrigerant from the condenser is passed through the central pipe from above the heat exchanging double spiral pipe and is regenerated as a liquid refrigerant; and then the regenerated liquid refrigerant is recovered into the recovery bomb; and a refrigerant charging channel for charging the collected equipment with the liquid refrigerant regenerated from the gaseous refrigerant;

recovery, regeneration and charging processes for the refrigerant to be recovered from the collected equipment being selectively controlled and carried out, the external pipe through which the oil-containing refrigerant passes and the central pipe through which the refrigerant passes being mutually heat-exchanged to heat the oil-containing refrigerant and cool the refrigerant passing through the central pipe, thereby effecting efficient regeneration and recovery of the liquid refrigerant.

2. A refrigerant processing apparatus for collected equipment comprising:

a supply-side refrigerant regeneration and recovery channel sequentially including collected equipment, a first recovery and charging passage provided with a suction rate regulating valve, a evaporating vaporization chamber of an oil separator provided with a heating unit, a second recovery and charging passage, an opening/closing valve, a dry filter, a compressor, a condenser, a first condensed liquid pipe, a heat exchanging double spiral pipe of the oil separator, a second condensed liquid pipe in which is inserted a check valve which allows a condensed liquid refrigerant to pass in a recovery direction thereof, and a recovery charging pipe provided with a opening/closing valve, the recovery charging pipe and a gaseous refrigerant regeneration pipe being provided on a recovery bomb;

an oil recovery channel which is branched off from the first recovery and charging passage and includes an oil drain in which an oil recovery valve is inserted;

a circulation-side refrigerant regeneration and recovery channel in which the recovery bomb and an inlet side of the opening/closing valve on the outlet side of which the dry filter is disposed are connected to each other by the gaseous refrigerant regeneration pipe provided with a gaseous refrigerant regeneration valve to return a regenerated refrigerant to the recovery bomb; and a refrigerant charging channel in which the recovery charging pipe and a liquid refrigerant charging pipe provided with a liquid refrigerant charging valve are extended from the recovery bomb and are connected to the second recovery and charging passage, and the first recovery and charging passage leads from the evaporating vaporization chamber of the oil separator to the collected equipment, the oil separator including as its body the evaporating vaporization chamber made of a hollow body which is closed at its top and bottom by a top end plate and a bottom end plate, respectively, the evaporating vaporization chamber including in its interior a separating wall positioned below the top end plate and provided to define a passage space between the top end plate and a periphery of the separating wall, and the heat exchanging double spiral pipe including a central pipe which serves as a liquid refrigerant recovery passage, and an external pipe which serves as a recovery passage to communicate with the first recovery and charging passage during recovery, the heat exchanging double spiral pipe being formed spirally about a vertical central axis of the oil separator to prevent a refrigerant from staying in the heat exchanging double spiral pipe, the bottom end plate of the evaporating vaporization chamber is provided with a first pipe joint, a fourth pipe joint, a bottom heater and a bottom temperature regulating unit, the first pipe joint leading at one end to a branch passage constructed to switch between the first recovery and charging passage and a passage leading to the oil drain, the other end of the first pipe joint being opened to the evaporating vaporization chamber as a port which serves as an oil outlet and a refrigerant inlet, the port and the external pipe of the heat exchanging double spiral pipe being formed as a recovery passage, the first pipe joint being provided with a selector function valve which switches a flow passage to either one of the branch passage and the recovery passage, the fourth pipe joint being inserted through the bottom end plate and being connected to a bottom end of the central pipe of the heat exchanging double spiral pipe to constitute an outlet of a liquid refrigerant, and the bottom heater for heating the evaporating vaporization chamber and the bottom temperature regulating unit being provided at a bottom surface of the bottom end plate, a second pipe joint and a third pipe joint being inserted through the top end plate or at the top of the evaporating vaporization chamber, the second pipe joint being opened at one end inside the evaporating vaporization chamber and being connected at the other end to the second recovery and charging passage, the third joint being connected at one end to a top end of the central pipe of the heat exchanging double spiral pipe and being connected at the other end to the first condensed liquid pipe, the first recovery and charging passage being connected to the first pipe joint, a check valve which allows only a flow in the direction of the recovery bomb being inserted in the second condensed liquid pipe which leads from the fourth pipe joint to the recovery bomb, the external pipe through which the oil-containing refrigerant passes and the central pipe through which the refrigerant passes being mutually heat-exchanged to effect temporally and economically efficient regeneration and recovery of the liquid refrigerant, a gaseous refrigerant remaining after processing in the supply-side refrigerant regeneration and recovery channel being recovered and regenerated as a liquid refrigerant by the circulation-side refrigerant regeneration and recovery channel recovering, thereby enabling a high rate of regeneration and recovery of the liquid refrigerant, a high rate of regeneration and recovery of the liquid refrigerant being effected by the circulation-side refrigerant regeneration and recovery channel which recovers a gaseous refrigerant remaining after processing in the supply-side refrigerant regeneration and recovery channel and regenerates the gaseous refrigerant as a liquid refrigerant.

3. An oil separator for a refrigerant processing apparatus for collected equipment, the oil separator including a heating unit for use in a refrigerant recovery system in which after an oil is separated from an oil-containing refrigerant of collected equipment, a liquid refrigerant is recovered into a recovery bomb through a condenser, the oil separator comprising as its body an evaporating vaporization chamber made of a hollow body which is closed at its top and bottom by a top end plate and a bottom end plate, respectively, the evaporating vaporization chamber including in its interior a separating wall positioned below the top end plate and provided to define a passage space between the top end plate and a periphery of the separating wall, and a heat exchanging double spiral pipe including a central pipe which serves as a liquid refrigerant recovery passage, and an external pipe which serves as a recovery passage to communicate with the first recovery and charging passage during recovery, the heat exchanging double spiral pipe being formed spirally about a vertical central axis of the oil separator to prevent a refrigerant from staying in the heat exchanging double spiral pipe, the bottom end plate of the evaporating vaporization chamber is provided with a first pipe joint, a fourth pipe joint, a bottom heater and a bottom temperature regulating unit, the first pipe joint leading at one end to a branch passage constructed to switch between the first recovery and charging passage and a passage leading to the oil drain, the other end of the first pipe joint being opened to the evaporating vaporization chamber as a port which serves as an oil outlet and a refrigerant inlet, the port and the external pipe of the heat exchanging double spiral pipe being formed as a recovery passage, the first pipe joint being provided with a selector function valve which switches a flow passage to either one of the branch passage and the recovery passage, the fourth pipe joint being inserted through the bottom end plate and being connected to a bottom end of the central pipe of the heat exchanging double spiral pipe to constitute an outlet of a liquid refrigerant, and the bottom heater for heating the evaporating vaporization chamber and the bottom temperature regulating unit being provided at a bottom surface of the bottom end plate, a second pipe joint and a third pipe joint being inserted through the top end plate or at the top of the evaporating vaporization chamber, the second pipe joint being opened at one end inside the evaporating vaporization chamber and being connected at the other end to the second recovery and charging passage, the third joint being connected at one end to a top end of the central pipe of the heat exchanging double spiral pipe and being connected at the other end to the first condensed liquid pipe, the first recovery and charging passage being connected to the first pipe joint, the fourth pipe joint being connected to the second condensed liquid pipe which leads to the recovery bomb.

4. A refrigerant processing apparatus for collected equipment and an oil separator according to claim 2 or 3, wherein the selector function valve of the first pipe joint which switches the flow passage is a float valve.

* * * * *